(12) United States Patent
McRae

(10) Patent No.: US 11,974,092 B2
(45) Date of Patent: Apr. 30, 2024

(54) BONE CONDUCTION COMMUNICATION SYSTEM AND METHOD OF OPERATION

(71) Applicant: Mobilus Labs Limited, London (GB)

(72) Inventor: Jordan McRae, London (GB)

(73) Assignee: Mobilus Labs Limited, London (GB)

(*) Notice: Subject to any disclaimer, the term of this patent is extended or adjusted under 35 U.S.C. 154(b) by 0 days.

(21) Appl. No.: 17/979,676

(22) Filed: Nov. 2, 2022

(65) Prior Publication Data
US 2023/0052568 A1 Feb. 16, 2023

Related U.S. Application Data

(63) Continuation of application No. 17/238,069, filed on Apr. 22, 2021, now Pat. No. 11,564,030, which is a
(Continued)

(51) Int. Cl.
*H04R 1/10* (2006.01)
*G02C 11/00* (2006.01)
*H04B 13/00* (2006.01)
*H04R 1/20* (2006.01)
*H04R 3/00* (2006.01)
(Continued)

(52) U.S. Cl.
CPC ............. *H04R 1/20* (2013.01); *G02C 11/10* (2013.01); *H04B 13/005* (2013.01); *H04R 1/1041* (2013.01); *H04R 3/12* (2013.01); *H04R 29/001* (2013.01); *H04R 2460/13* (2013.01)

(58) Field of Classification Search
CPC . H04R 1/00; H04R 1/02; H04R 1/028; H04R 1/08; H04R 1/10; H04R 1/1016; H04R 1/1041; H04R 1/105; H04R 1/1058; H04R 1/1066; H04R 1/1075; H04R 1/20; H04R 3/00; H04R 3/04; H04R 3/12; H04R 29/00; H04R 29/001; H04R 29/004; H04R 2400/01; H04R 2201/107; H04R 2460/01;
(Continued)

(56) References Cited

U.S. PATENT DOCUMENTS 5,008,954 A   4/1991   Oppendahl
5,404,577 A   4/1995   Zuckerman et al.
(Continued)

FOREIGN PATENT DOCUMENTS

CA   2578083 A1   3/2006
CN   204948312 U * 1/2016   ............... H04R 1/10
(Continued)

OTHER PUBLICATIONS

English Translation, CN-204948312-U, Dated Jan. 2016.*
English Translation, JP-2010010945-A, Dated Jan. 2010.*
English Translation, JP-2009049844-A, Dated Mar. 2009.*

*Primary Examiner* — Thang V Tran
(74) *Attorney, Agent, or Firm* — Jeffrey Schox; Randy Mehlenbacher

(57) ABSTRACT

A method for operating a bone conduction communication system can include establishing a communicable connection, operating a transducer in an input mode wherein the bone conduction transducers are configured to detect a vibration associated with a bone of the user; transmitting an audio signal over the communicable connection; and operating the transducers responsive to the audio signal.

25 Claims, 16 Drawing Sheets

Related U.S. Application Data continuation of application No. 17/062,023, filed on Oct. 2, 2020, now Pat. No. 11,026,013.

(60) Provisional application No. 62/909,654, filed on Oct. 2, 2019.

(51) Int. Cl.
*H04R 3/12* (2006.01)
*H04R 29/00* (2006.01)

(58) Field of Classification Search
CPC .. H04R 2460/13; G02C 11/10; H04B 13/005; H04B 11/00; A42B 3/30; A42B 3/306
See application file for complete search history.

(56) References Cited

U.S. PATENT DOCUMENTS

| | | | |
|---|---|---|---|
| 5,889,730 | A | 3/1999 | May |
| 7,072,476 | B2 | 7/2006 | White et al. |
| 7,110,743 | B2 | 9/2006 | Depew et al. |
| 7,818,037 | B2 | 10/2010 | Lair et al. |
| 8,111,860 | B2 | 2/2012 | Retchin et al. |
| 8,325,964 | B2 | 12/2012 | Weisman |
| 9,179,228 | B2 | 11/2015 | Ruppersberg et al. |
| 9,955,270 | B2 | 4/2018 | Parker |
| 10,133,358 | B1 | 11/2018 | Chen et al. |
| 10,230,419 | B2 | 3/2019 | Bharadia et al. |
| 10,699,691 | B1 | 6/2020 | Ye et al. |
| 10,728,649 | B1 | 7/2020 | Holman |
| 10,743,094 | B2 * | 8/2020 | Jan ................ A42B 3/0406 |
| 11,026,013 | B2 | 6/2021 | McRae |
| 2003/0043940 | A1 | 3/2003 | Janky et al. |
| 2009/0304210 | A1 | 12/2009 | Weisman |
| 2010/0223706 | A1 | 9/2010 | Becker et al. |
| 2013/0083940 | A1 | 4/2013 | Hwang |
| 2013/0245363 | A1 | 9/2013 | Johansson |
| 2014/0363020 | A1 | 12/2014 | Endo |
| 2015/0117688 | A1 | 4/2015 | Kim et al. |
| 2015/0130945 | A1 | 5/2015 | Yu et al. |
| 2015/0271590 | A1 | 9/2015 | Nakagawa et al. |
| 2016/0248894 | A1 | 8/2016 | Hosoi et al. |
| 2017/0156010 | A1 | 6/2017 | Verma et al. |
| 2017/0332162 | A1 | 11/2017 | Lin et al. |
| 2017/0366891 | A1 | 12/2017 | Yang |
| 2018/0336874 | A1 | 11/2018 | Hui et al. |
| 2019/0181823 | A1 | 6/2019 | Pedersen et al. |
| 2019/0253547 | A1 * | 8/2019 | Kunimoto ............ H04R 1/1033 |
| 2019/0342647 | A1 | 11/2019 | Mehra et al. |
| 2020/0154192 | A1 | 5/2020 | Patil et al. |

FOREIGN PATENT DOCUMENTS

| | | | | |
|---|---|---|---|---|
| CN | 206380059 U | * | 8/2017 | ............... H04R 1/10 |
| JP | S60128725 A | | 7/1985 | |
| JP | H05329134 A | | 12/1993 | |
| JP | H09326731 A | | 12/1997 | |
| JP | 2009049844 A | * | 3/2009 | ............... H04R 1/00 |
| JP | 2010010945 A | * | 1/2010 | ............... H04R 1/00 |
| KR | 20060114914 A | | 11/2006 | |
| KR | 20070119613 A | | 12/2007 | |
| KR | 20100014752 A | | 2/2010 | |
| WO | 2014205484 A1 | | 12/2014 | |

* cited by examiner

BONE CONDUCTION COMMUNICATION SYSTEM AND METHOD OF OPERATION

CROSS-REFERENCE TO RELATED APPLICATIONS

This application is a continuation of U.S. application Ser. No. 17/238,069, filed 22 Apr. 2021, which is a continuation of U.S. application Ser. No. 17/062,023, filed 2 Oct. 2020, which claims the benefit of U.S. Provisional Application No. 62/909,654, filed 2 Oct. 2020, each of which is incorporated in their entirety by this reference.

TECHNICAL FIELD

This invention relates generally to the bone conduction field, and more specifically to a new and useful system and method in the bone conduction field.

BACKGROUND

Aural communication traditionally requires either having ears blocked by a speaker or open to air. However, this can lead to unsafe conditions (e.g., reduced situational unawareness, removing PPE to communicate, exposure to loud noise etc.). Thus, there is a need in the acoustics field to create a new and useful system and method. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
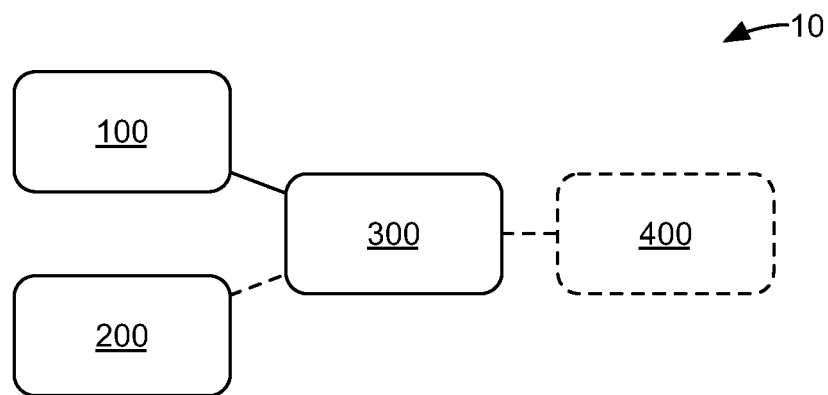
FIG. 1 is a schematic representation of the system.
Figure 2A:
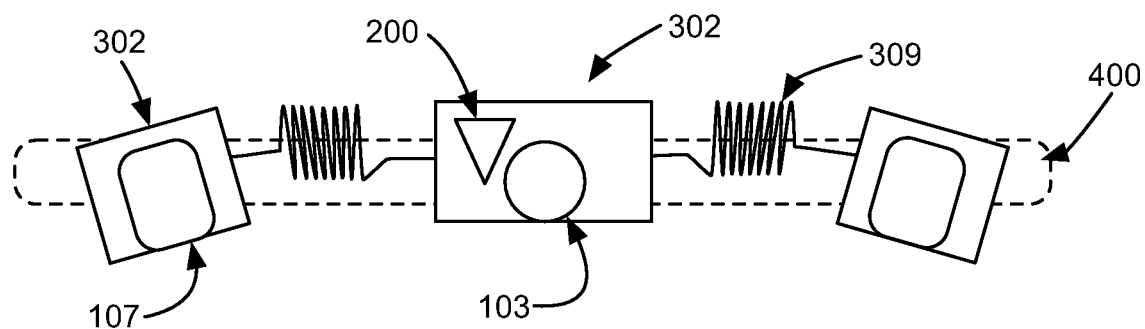
FIGS. 2A and 2B are schematic representations of an embodiment of the system shown from side and top down views.
Figure 2B:
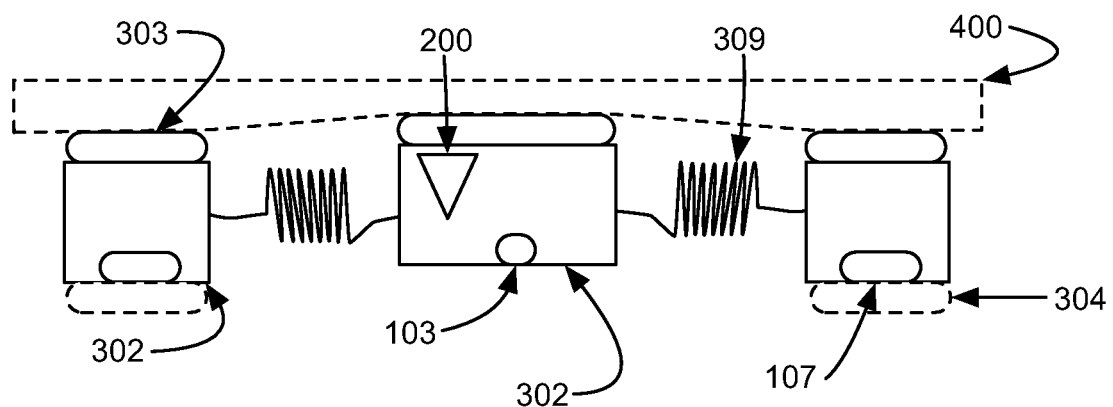

A bone conduction communication system 10, as shown in FIG. 1, can include one or more: transducers 100, computing devices 200, housings 300, and/or any suitable components. The system can optionally include one or more wearables 400, and/or any suitable components. The system preferably uses bone conduction (e.g., vibrations of the user's bones such as bones of the skull) to conduct sound from and to the user.

In a specific example of the use of the system, the system can be coupled to headwear (e.g., a helmet) on a user. The headwear can help ensure adequate coupling between the system and the user (e.g., that the vibrations produced when a user speaks can be detected by the system, that vibrations produced by the system can be heard by a user, etc.). In this specific example, when a user speaks, the vibrations of the user's skull can be detected by a transducer and transmitted to another user. In this specific example, a transducer can vibrate the user's bones which can transfer the vibrations to the cochlea (e.g., "inner ear") to enable the user to hear the vibration signal. For instance, the user can hear the vibration signal without blocking the ear canal of the user and/or hear the vibration even with ear protection (e.g., PPE, sound blocking ear plugs, etc.) in place. However, the system can be arranged in any suitable manner.

Figure 9:
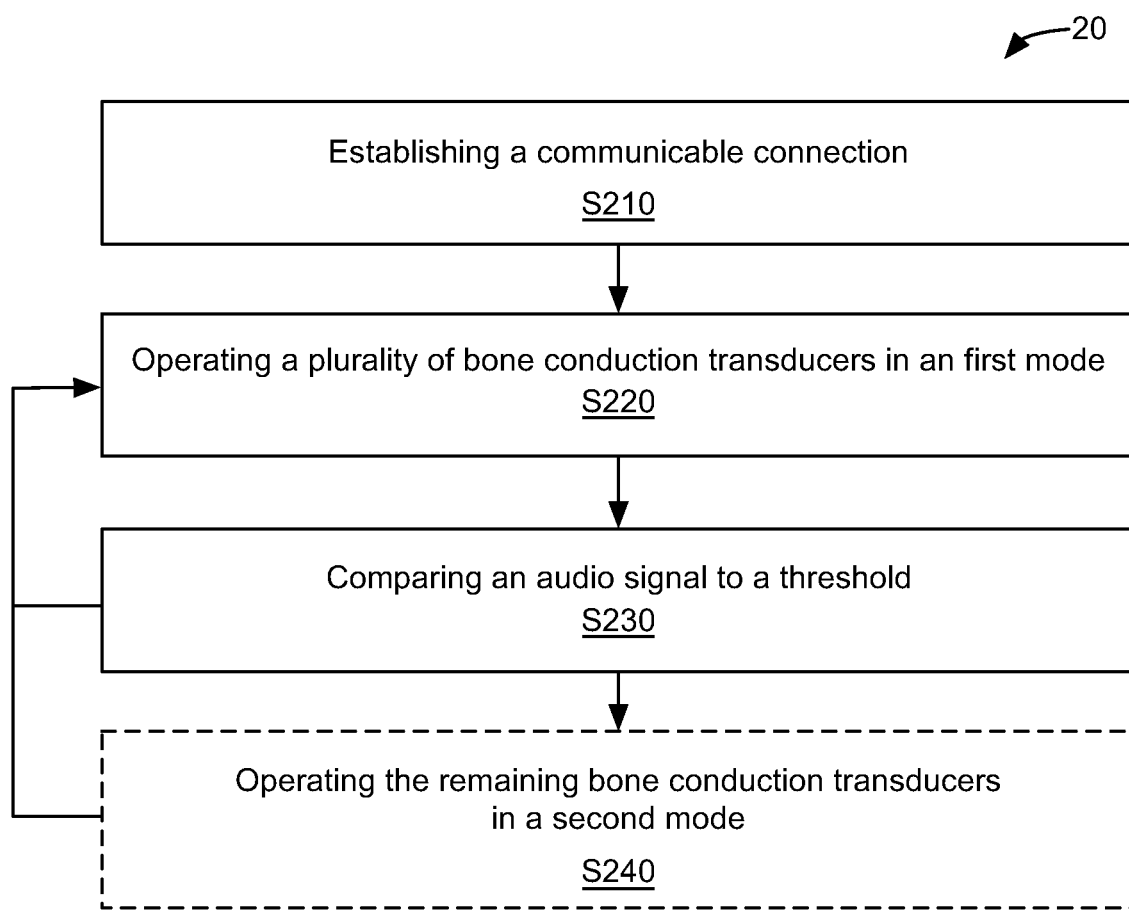
FIG. 9 is a schematic representation of an example method of using bone conduction communication systems.

A method 20 of operating a communication system, as shown in FIG. 9, can include establishing a communicable connection S210, operating the communication system in a first mode S220, comparing an audio signal to a threshold S230, operating the communication system in a second mode S240, and/or any suitable steps.

The method preferably functions to enable half-duplex operation of a communication system, but can additionally or alternatively enable full duplex, simplex, and/or any suitable communication. The half-duplex operation preferably mimics full duplex communication (e.g., the conversation does not feel choppy, laggy, or like only one user can speak), but can produce any user experience.

2. Benefits.

Variations of the technology can confer several benefits and/or advantages.

First, variants of the technology can encourage/support users to wear environment appropriate personal protective equipment (PPE) (e.g., helmets, earplugs, masks, earmuffs, googles, face shields, respirators, etc.). In specific examples, the technology can be readily integrated with existing PPE.

In other specific examples, the technology can enable communication (e.g., speaking, listening, etc.) without removing hearing protection.

Second, variants of the technology can be configured to work for almost any user (e.g., without limitations for height, weight, head size, body shape, etc.). In specific examples, the technology can include adjustments that ensure almost any user can achieve a good fit (e.g., efficient coupling, comfortably wear, etc.).

Third, variants of the technology can enable a user to hear/communicate, in particular in noisy environments (e.g., when the ambient noise level is >85 dB, >90 dB, >100 dB, >110 dB, >120 dB, >140 dB, etc.). In specific examples, the technology can be insensitive to noise in the background and can be sensitive to verbal communication from the user. The insensitivity to the background can be prepared by balancing the technology so that the system does not move significantly due to vibrations in the air, by protecting/isolating the transducers from the environment, and/or in any suitable manner.

Fourth, variants of the technology can promote hygienic use of PPE. In specific examples, because the technology is not inserted into a user's ear, the technology can be readily cleaned and hygienically used by others. The technology can help users overcome the wisdom of repugnance (e.g., "yuck" factor) such as the yuck factor that may be present for users to share pieces that go inside the ear.

Fifth, variants of the technology can be worn at any suitable location on the user's body. In specific examples, the technology can be light-weight (e.g., <80 g) and compact (e.g., <5 cm$^2$, <10 cm$^2$, etc.) to enable the device to be worn at any suitable location on the user's body.

Sixth, variants of the technology can enable hands free & ears free verbal communication. Specific examples of the technology can be configured to leave one or both ears clear (e.g., technology does not need to go inside pinna, inside ear canal, etc.) and/or leave the space directly in front of the mouth free (e.g., nothing to collect speech within 1 mm, 1 cm, 5 cm, 10 cm, etc. of the mouth). In these specific examples, the technology can facilitate user awareness of their surroundings (e.g., because their ears remain unblocked and thus the user is able to hear their surroundings), proper arrangement of PPE (e.g., ensure snug fit for helmets because they do not need to accommodate additional space for microphones), and/or enable safety in any suitable manner.

Seventh, variants of the technology can enable a single bone conduction transducer to be operated as both a speaker and a microphone with little or no background in the communication. Specific examples of the technology can enable the dual use of a single (or every) transducer by operating the transducer(s) in either an input (e.g., microphone) or output mode (e.g., speaker). The user experience can be enhanced, in some examples, by switching between modes based on a threshold signal level and/or automatically switching between the modes.

However, variants of the technology can confer any other suitable benefits and/or advantages.

3. System.

The system preferably functions to receive vibrations associated with audio input and produce vibrations associated with audio output (e.g., via bone conduction), facilitate verbal communication between one or more users (e.g., in noisy environments), and/or any suitable function. The system can facilitate half-duplex, full duplex, simplex, and/or any suitable communication.

3.1 Transducer.

The transducer(s) 100 (e.g., vibration receiver, vibration microphone, vibration transmitter, vibration speaker, vibration headphones, bone conduction microphone, bone conduction speaker, bone conduction headphones, etc.) preferably functions to convert between vibration signals (e.g., sound signals; speech; communications, body vibrations such as breathing, heartbeat, heartrate, seizures, muscle contractions, tremors, etc.; etc.) and electric signals, receive and transmit vibrations (e.g., generated while a user is talking, in response to received data, etc.), and/or perform any suitable function. The transducers can optionally function to provide one or more haptic signals to a user (e.g., the transducer can be operated at a frequency below that of human hearing, with a haptic waveform, etc.); however, the transducer(s) can perform any suitable function. The transducers preferably conduct the vibrations through a user's bones (e.g., skull, mandible, mastoid, temporal bone, sphenoid, occipital bone, parietal bone, frontal bone, clavicle, etc.); however, a user's muscles, skin, and/or any suitable conduction material can be used.

The transducer(s) are preferably connected to the computing device(s); however, the transducers can be coupled to the computing device(s), and/or otherwise suitably configured. The transducers are preferably mounted inside the housing (e.g., on a side of the housing arranged to be worn proximal a head surface of a user); however, the transducers can be mounted on the housing, directly on the user, and/or in any suitable configuration.

The transducers can be: crystal transducers (e.g., including piezoelectric material such as lead zirconium titanate (PZT), barium titanate (BTO), quartz, polyvinylidene fluoride (PVDF), etc.; ferroelectric materials; etc.), electromechanical transducer (e.g., a dynamic transducer, a coil of wire such as a solenoid with a magnet that can translate within the coils along the coil axis, etc.), a condenser transducer (e.g., two parallel plates, wherein on plate can move relative to the other plate in response to a vibration), a ribbon transducer (e.g., a strip of electrically conductive metal such as aluminium suspended in a magnetic field), an optical transducer (e.g., based on an interferometer), and/or any suitable transducer can be used.

The transducers are preferably configured to have a flat response (e.g., produce the same output power for the same input power at different frequencies) to vibrational frequencies and/or ranges thereof between 0.01-50 kHz such as 10 to 100 Hz, 100 to 400 Hz, 0.4 to 4 kHz, 0.4 to 8 kHz, 0.4 to 20 kHz, and/or any suitable vibration frequency. However, the transducers can have a nonflat response, a nonlinear response, can be corrected to have a flat response, have a tailored response (e.g., greater response at predetermined frequencies), and/or any suitable response to different frequencies. The frequency response can depend on the size, shape, composition, geometry, stiffness, and/or any suitable parameters of the transducer. The transducer geometry is preferably a square prism; however, the transducer can be cylindrical, prismatoid, hemisphere, hemicylinder, and/or any suitable geometry. In some variants, each transducer can be configured to have a different response to different frequencies, which can function to isolate the transducers.

Figure 7:
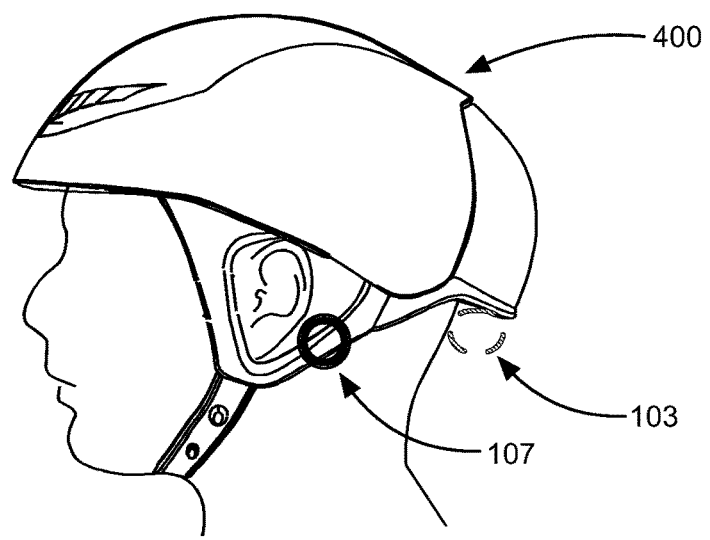
FIG. 7 is a schematic representation of an embodiment of the system arranged on a user.

In a first variant of the system, the transducers 100 can be configured as: receivers 103 (e.g., configured to detect vibrations such as those produced when a user is speaking), transmitters 107 (e.g., configured to produce vibrations such as to provide audio signals to a user), and/or any suitable components. In these variants, the system can optionally include a second transducer that functions as the complimentary transmitter or receiver. However, one or more transducers can be configured to operate as both a transmitter and a receiver, be configured to operate at different response frequencies, and/or be otherwise configured. The receiver(s) are preferably arranged at a symmetric point with respect to the user's skull between the user's ears (e.g., on a central plane that bisects the user's skull such as on the parietal bone, example as shown in FIG. 8B, etc.); however, the receiver(s) can be asymmetrically arranged, arranged at any location on a head surface of a user, arranged on a neck and/or chest surface of a user (e.g., above a user's clavicle), and/or otherwise suitably arranged. The transmitter(s) are preferable arranged at a point behind (e.g., posterior) the user's ear (e.g., on the mastoid of the temporal bone, example as shown in FIG. 7, etc.); however, the transmitters can be arranged above the user's ear, in front of the user's ear, coupled to the user's pinna, and/or otherwise suitably arranged. The receiver(s) are preferably a different type of transducer from the transmitters; however, the receiver and transmitter can be the same type of transducer.

In a second variant, each transducer can be operable between an input (e.g., receiver, 'speaker' wherein speaker refers to activity of the user, etc.) mode and an output (e.g., transmitter, 'listener', etc.) mode. In the input mode, the transducer can be operable to detect a vibration of a head surface of a user and convert said vibration into an audio signal. In the output mode, the transducer can be operable to receive an audio signal and transmit a vibration to the head surface of the user. The default mode of operation is preferably the input mode, but the transducer can default to output mode, default to a mode selected based on a user preference or selection, default to a mode based on a user characteristic (e.g., job title, location, activity, etc.), and/or default to any suitable mode. In a first illustrative example, each transducer of the bone conduction communication system can be operable as a receiver in the input mode and as a transmitted in the output mode. However, one or more transducer can be operable in any suitable mode. In a second illustrative example, in the input mode only transducers configured to operate as receivers can be in an active state (e.g., 'on' whereas other transducers can be inactive) while in the output mode only transducers configured to operate as transmitted can be in an active state. However, the transducers can be operable in any suitable mode of operation (e.g., haptic mode, speech mode, mixed haptic and speech mode, etc.).

Transducers are preferably isolated (e.g., mechanically, electrically, acoustically, spatially, etc.) from other transducers. However, transducers can be weakly coupled to other transducers, coupled to other transducers, and/or be otherwise coupled to transducers. The transducers can be isolated physically, digitally, and/or otherwise be isolated. The isolators can function to minimize interference (e.g., echo, feedback, reverb, etc.) between transducer(s).

In some variants, the transducers can be configured to produce haptic signals. The haptic signals (e.g., signals that are interpreted as touch) can be produced by changing the output frequency (e.g., operating one or more transducers at an infrasound frequency such as <400 Hz, <20 Hz, etc.), the output waveform (e.g., clicks, ramps, buzzes, hums, pulses), haptic modulation (e.g., amplitude modulation, frequency modulation), and/or any suitable characteristic of the transducer output. Examples of characteristics of the haptic signals include: timing, duration, sharpness, intensity, granularity, amplitude, timbre, and/or any suitable characteristics. The haptic signals (e.g., characteristics of the haptic signals) can be dependent on or independent of the communication signals. In a specific example, haptic signals can be applied at substantially the same time as (e.g., contemporaneously) a user receives a communication from another user in their vicinity. For instance, the haptic signals can be applied differently through a transducer on the left and right sides of a user's head to indicate to the user what direction the communication is coming from. However, the haptic signals can be provided asynchronously and/or with any timing relative to the communication and/or with any timing. However, the haptic signals can be configured in any suitable manner.

Figure 8A:
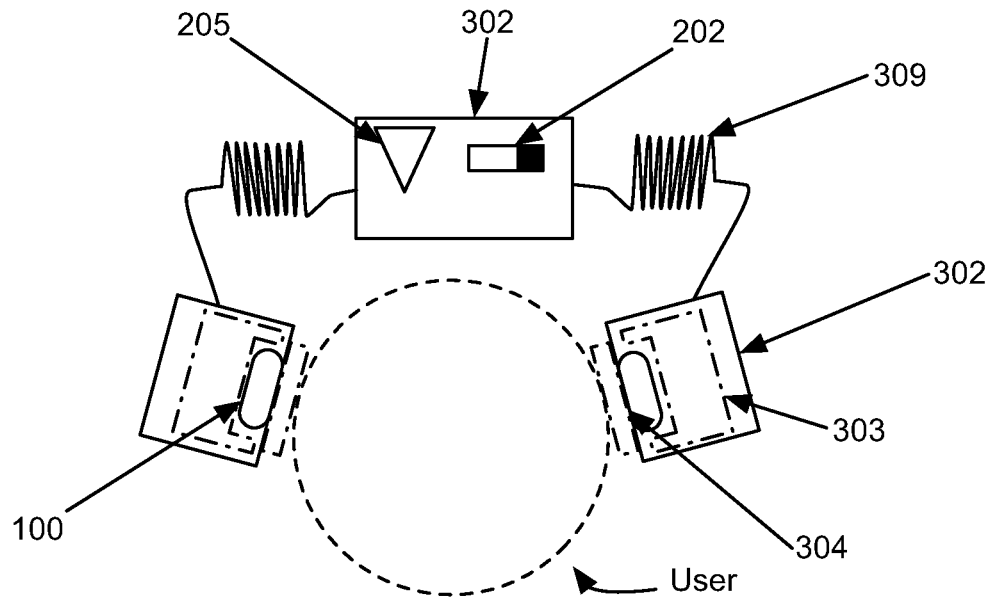
FIGS. 8A and 8B are schematic representations of embodiments of the system as worn on a user.
Figure 8B:
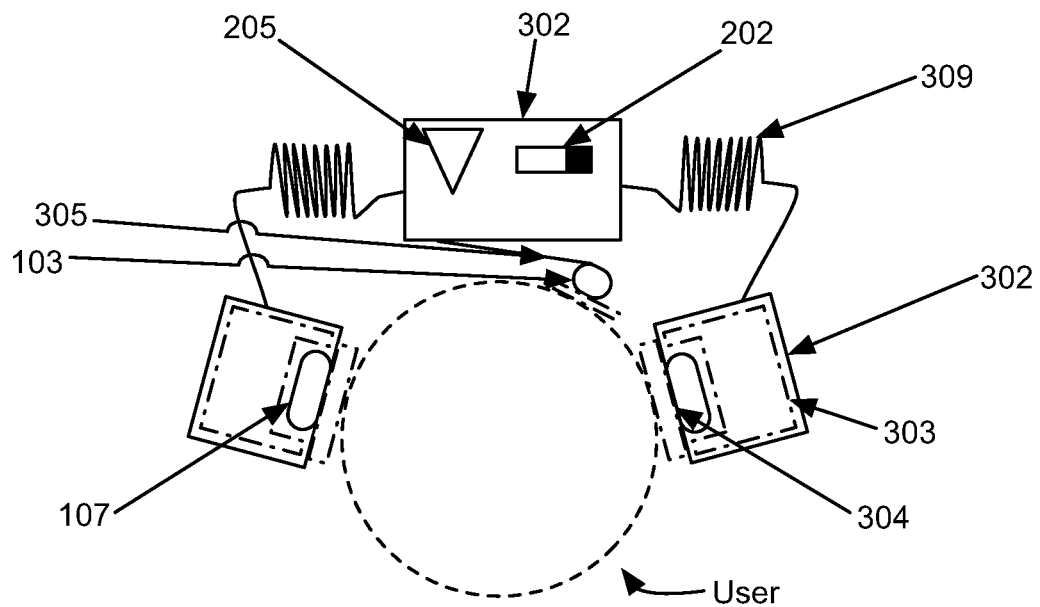

In a first specific example as shown in FIG. 8A, the system can include two transducers each of which can be arranged on one of the mastoid bones behind an ear of the user. In this specific example, each transducer can be operable between two or more modes (e.g., between an input and output mode, between receiver and transmitter mode, etc.). In a second specific example as shown in FIG. 8B, the system can include one receiver that can be centrally arranged at the back of the user's head and two transmitters each of which can be arranged on one of the mastoid bones behind an ear of the user. In this example, the receiver can be a crystal transducer and the transmitter can be a electromechanical transducer.

3.2 Computing Device.

The computing device(s) 200 preferably function to control the system operation. For example, the computing device(s) can store (e.g., communication), analyze (e.g., sensor outputs), transmit and/or receive (e.g., sound signals), process (e.g., convert sound signals such as between formats, to make the signals clearer, etc.), modify a mode of operation for one or more transducer, and/or perform any suitable function. The computing device(s) are preferably mounted in the housing; however, the computing device(s) can be remote (e.g., server, network, cloud, etc.), distributed, and/or otherwise suitably arranged relative to the housing and/or the transducer(s). The computing device is preferably in electrical communication with the transducers; however, the computing device can be coupled to the transducers, in wireless communication with the transducers, and/or otherwise suitably configured. The computing device can be configured to use digital, analog, any combination thereof and/or any suitable technology.

Figure 3:
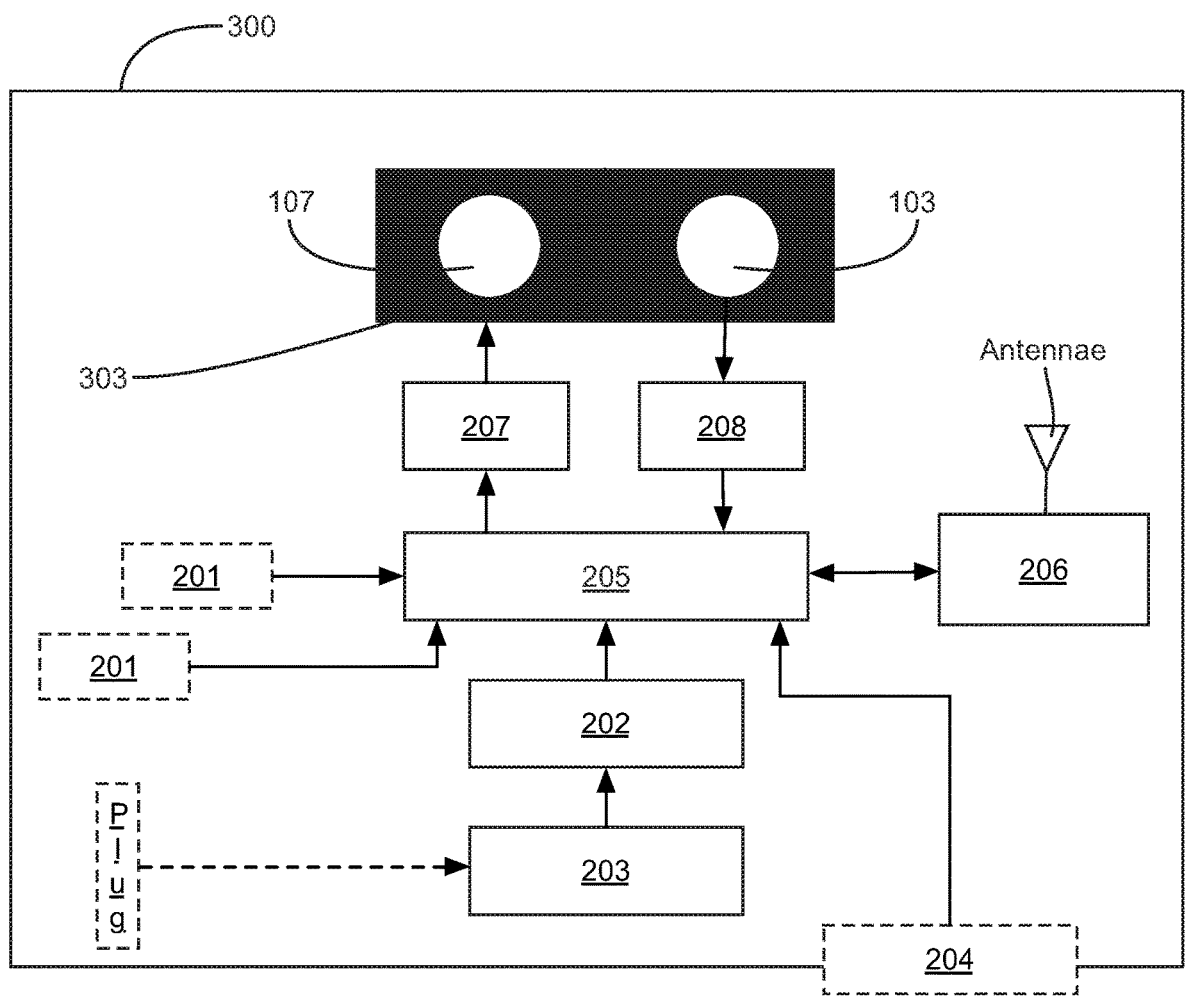
FIG. 3 is a schematic representation of an embodiment of a computing system.

As shown for example in FIG. 3, the computing device can include one or more: digital signal processors 205 (DSPs), analogue to digital converters 208 (ADCs), digital to analogue converters 207 (DACs), electrical isolators, bandpass filters, power supply 202, communication module 206, and/or any suitable component. The computing device can optionally include one or more sensor 201, user interface 204, relay 209, and/or any suitable component.

The DSPs 205 can be configured to manipulate the sound signals (e.g., echo cancellation; compress sound signals; amplify sound signals; etc.) detected and/or transmitted by the transducer(s), determine whether a sound signal exceeds a threshold (e.g., a threshold voltage, threshold duration, threshold frequency bandwidth, etc.), operate the mode selector, and/or be otherwise configured. The ADCs 208 can be configured to convert the sound signals detected by the receiver(s) from analog to digital (e.g., for transmission, for storage, to comply with data transmission standard, etc.); however, the ADC can be otherwise suitably configured. The DACs 207 can be configured to convert the sound signals received from other users from digital to analog (e.g., to enable the transmitter to transmit the signal to the user); however, the DAC can be otherwise suitably configured.

The filter(s) can function to remove one or more frequencies and/or ranges from the audio signal (e.g., transmitted audio signal, received audio signal). The filters can be digital and/or analog filters. The filter(s) can be long pass (e.g., transmit frequencies greater than about: 10, 20, 50, 100, 200, 400, 500, 600, 800, 1000, 2000, 2500, 3000, 4000, 5000, etc. Hz), short pass (e.g., transmit frequencies less than about: 20000, 15000, 10000, 8000, 7500, 6000, 5000, 4000, 3000, 2000, 1000, 500, 400, etc. Hz), bandpass (e.g., transmit frequencies with a frequency range such as 400-8000 Hz, 400-20000 Hz, 400-10000 Hz, 1000-8000 Hz, a lower bound long pass frequency, an upper bound short pass frequency, etc.), notch (e.g., transmit all frequencies except those within a frequency range), and/or any suitable filters.

The electrical isolators (e.g., electric isolators) preferably function to process the sound signals (such as to decrease the amount of signal that is detected at one transducer and transmitted by another transducer) to reduce audio feedback and/or other unwanted sound signals. The electrical isolator is preferably an echo processor; however, the electrical isolator can be a component of the digital signal processor, and/or any suitable processor. The electrical isolator can be configured to turn off the vibration transmitter when the vibration microphone is in use and vice versa (e.g., an echo suppressor), configured to detect that a signal is repeating (e.g., with a known time delay wherein the time delay depends on the user, the distance between the transducers, etc.) and remove the repeating signal (e.g., an echo cancellation device), and/or otherwise suitably configured. The electrical isolator can operate on an analogue sound signal, a digital sound signal, and/or both sound signals.

The communication module 206 preferably functions to transmit and receive sound signals (e.g., from other users, to other users, to a remote computing system, from a remote computing system, to memory, from memory, etc.). The communication module can interface with any suitable telecommunications network (e.g., telephone network, the Internet, etc.). The communication module can include any suitable short-range (e.g., Bluetooth, near-field communication (NFC), radio frequency (RF), infrared (IR), Zigbee, Z-wave, local area network (LAN), dedicated communication network, etc.) and/or long-range communication systems (e.g., cellular radio such as global system for mobile communications (GSM) compatible, code division multiple access (CDMA) compatible, etc.; WiFi radio; satellite, dedicated communication network, wide area network (WAN), etc.). The communication module is preferably configured to interface (e.g., convert) between two or more communication systems. In a specific example, the communication module can receive a signal in radio frequency and broadcast the signal via cellular radio; however, the communication module can be otherwise suitably configured.

The sensors 201 can function to detect information (e.g., contextual information) about the environment and/or user. The sensors can include one or more: audio sensors (e.g., microphones), kinematic sensors (e.g., inertial measurement unit (IMU), accelerometer, gyroscope, etc.), location sensors (e.g., GPS), automatic identification and data capture (AIDC) (e.g., RFID sensors), optical sensors (e.g., camera), temperature sensors, infrared (IR) sensors, user state (e.g., sphygmomanometer, pulse oximeter, breathalyzer, glucose meter, etc.), and/or any suitable sensors.

Figure 12:
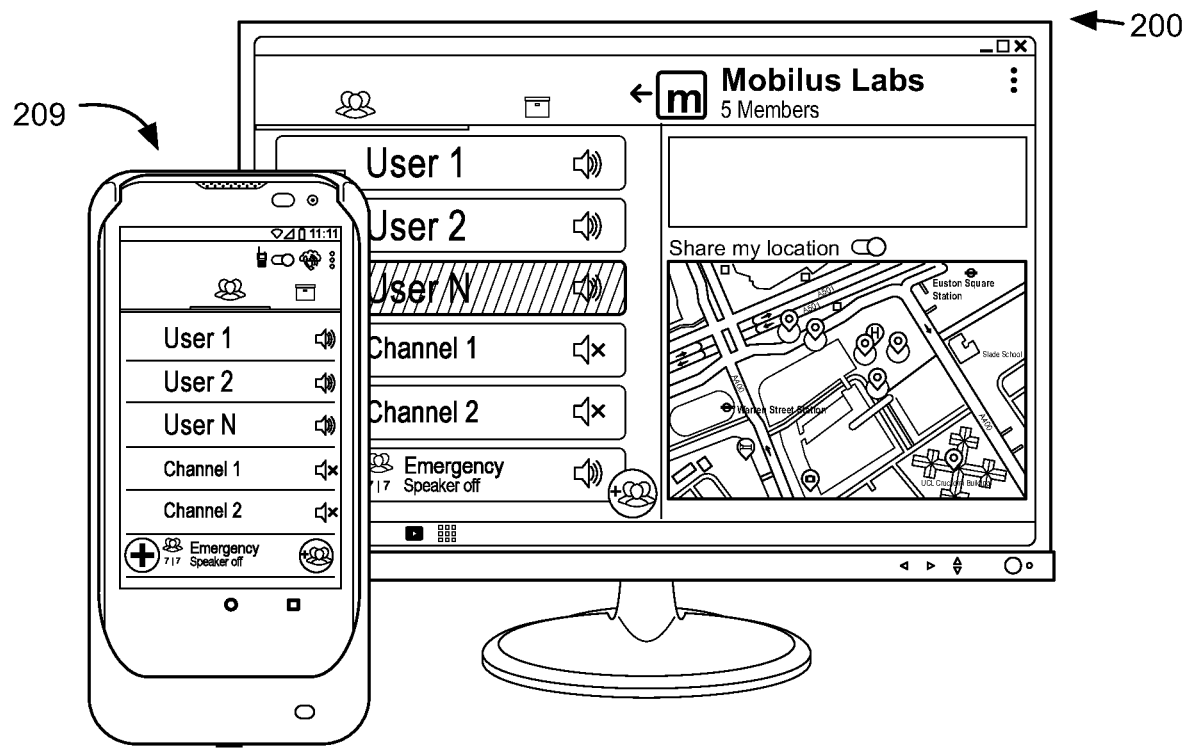
FIG. 12 is a schematic representation of an example of a computing system running an application to operate a communication system and a relay.

The user interface 204 can function to enable the user to modify one or more operation parameters of the communication system. The user interface can be arranged on one or more compartments (e.g., outward facing surfaces of the compartments), in an application running on a computing system (as shown for example in FIG. 12), and/or otherwise be arranged. The user interface can be a contact or noncontact interface. In a first variant, the user interface can include a button (e.g., arranged on the outward facing surface of a transducer compartment). In a second variant, the user interface can include a force and/or capacitive sensor (e.g., arranged on the outward facing surface of a transducer compartment, arranged on an inward facing surface of a transducer compartment, etc.). In a third variant, the user interface can include an optical (e.g., infrared (IR)) or acoustic (e.g., ultrasonic) sensor configured to respond to a gesture within a predetermined distance of the sensor. In a fourth variant, the user interface can be digital. In a first example of the fourth variant, a digital processor can be used to identify an activation phrase when spoken by a user. In a second example of the fourth variant, a digital processor can be used to identify a predetermined vibration characteristic (e.g., based on a frequency, waveform, bandwidth, duration, etc. such as detected by the transducer or another sensor) associated with an activation command such as tapping a helmet. In a third example of the fourth variant, the user interface can include and/or be an application running on a user device (such as the relay). However, any user interface can be used. In some embodiments, different interaction schemes (e.g., number, duration, pattern, etc. of interaction with the user interface) can enact different changes and/or operation of the communication system. For example, pressing the user interface once can turn the system on while pressing the user interface twice can turn the system off. However, the user interface can operate in any manner.

The user interface can include a mode selector, which can function to select and/or change the mode of operation for the transducers. The transducer mode of operation can include: full duplex (e.g., two-way simultaneous conversation), half-duplex (e.g., only one speaker at a time), push-to-talk (e.g., hold mode selector to enable transmitter), always on (e.g., transmitter(s) are always active), automatic switching (e.g., automatically switch between transmitting and receiving, based on time, based on use, etc.), and/or any suitable modes of operation. The mode selector can be voice controlled, a tap sensor, a touch sensitive sensor, control knob, and/or be any suitable selector. In a specific example, for instance to change a transducer from an input mode to an output mode, the mode selector can include a switch which automatically (e.g., responsive to a trigger, responsive to a signal from a DSP, after a predetermined time, etc.) changes the transducer between the input and output modes.

Figure 13:
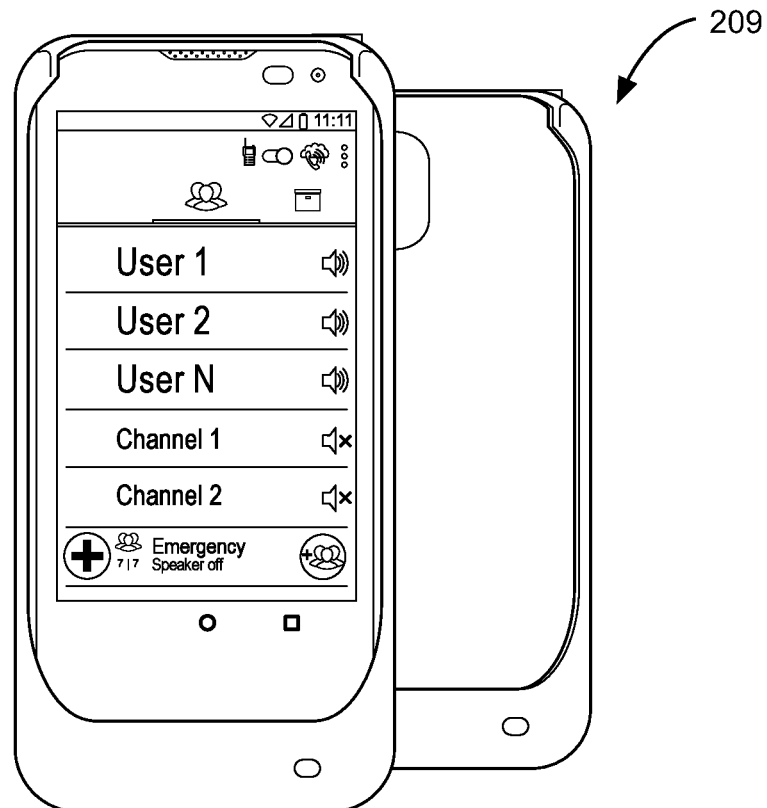
FIG. 13 is a schematic representation of an example of a relay.
Figure 14A:
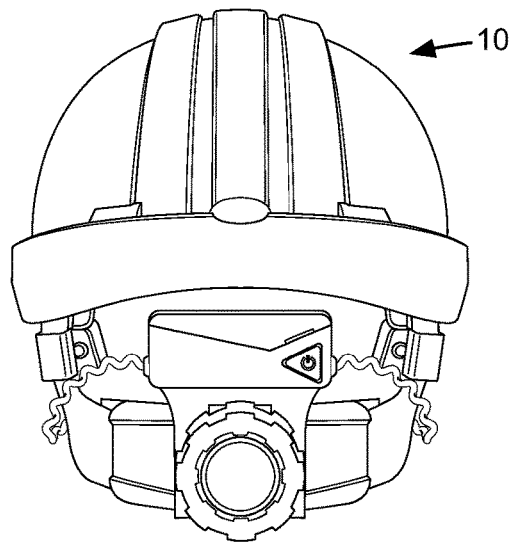
FIGS. 14A, 14B, and 14C are schematic representations of an example of a communication system as shown from a front, back, and side view respectively.
Figure 14B:
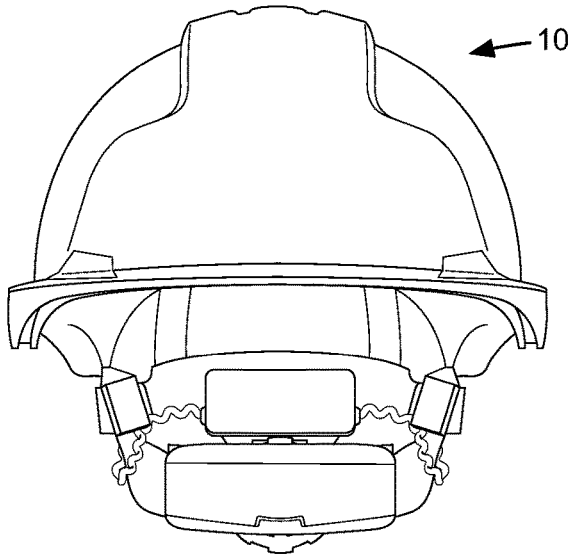
Figure 14C:
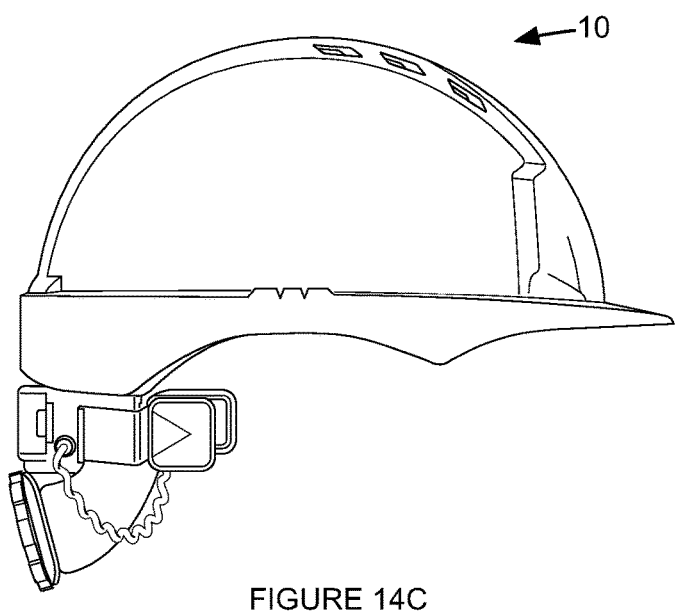
Figure 15A:
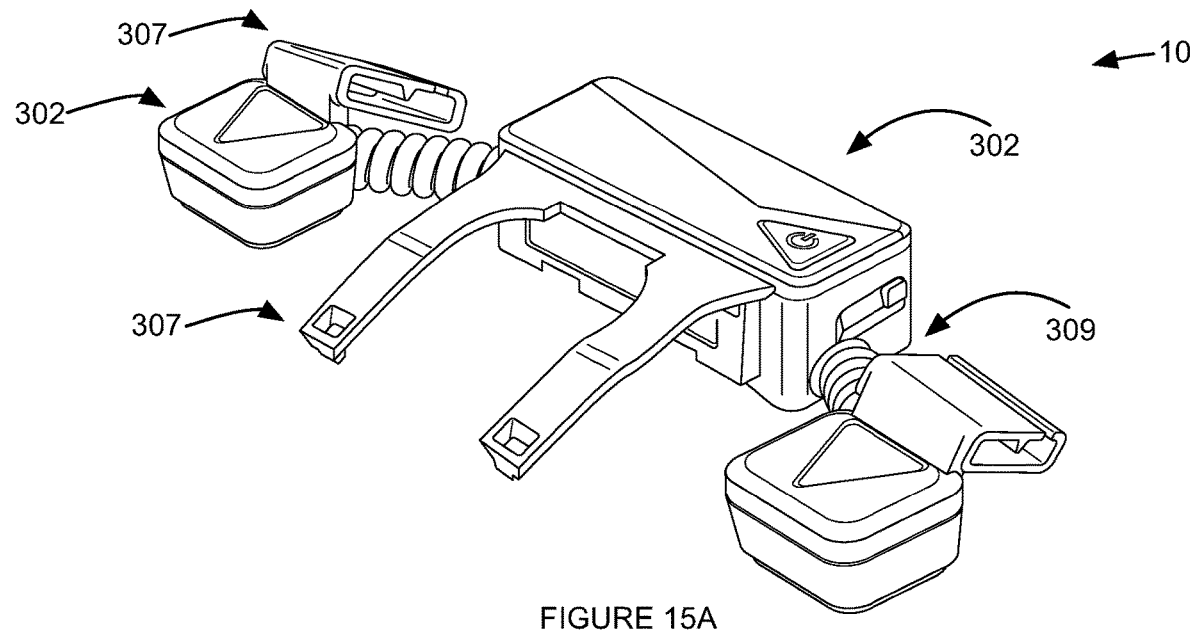
FIG. 15A is an isometric view from the top right of an example of a bone conduction communication system.
Figure 15B:
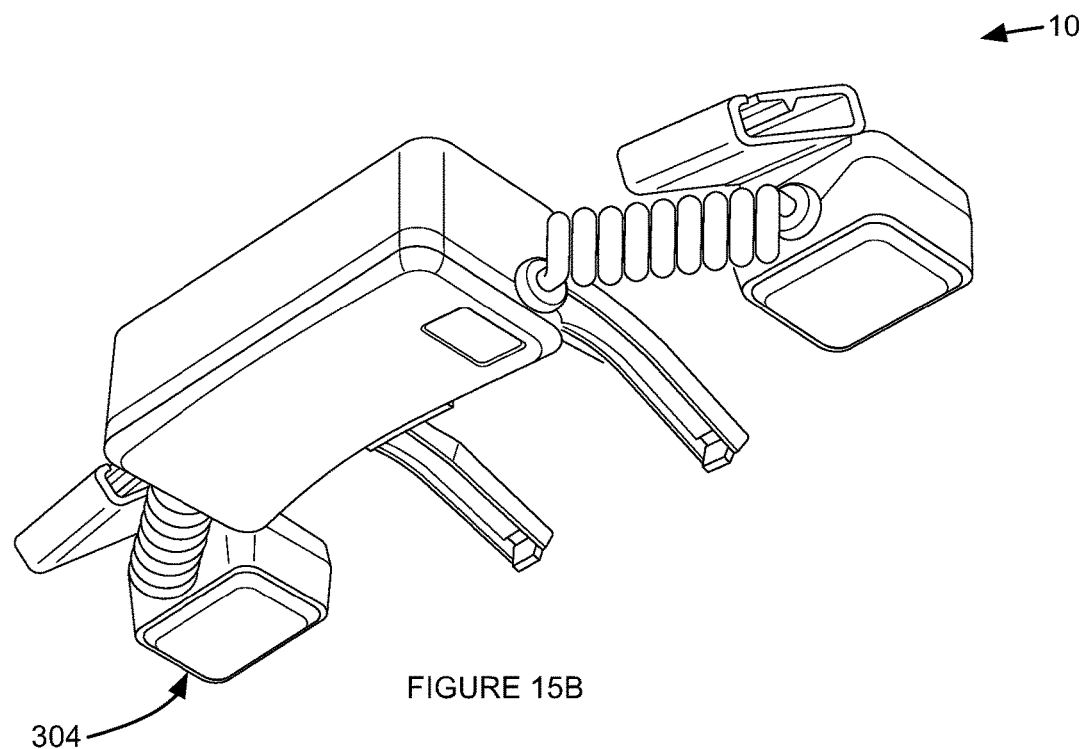
FIG. 15B is an isometric view from the bottom left of an example of a bone conduction communication system.
Figure 15C:
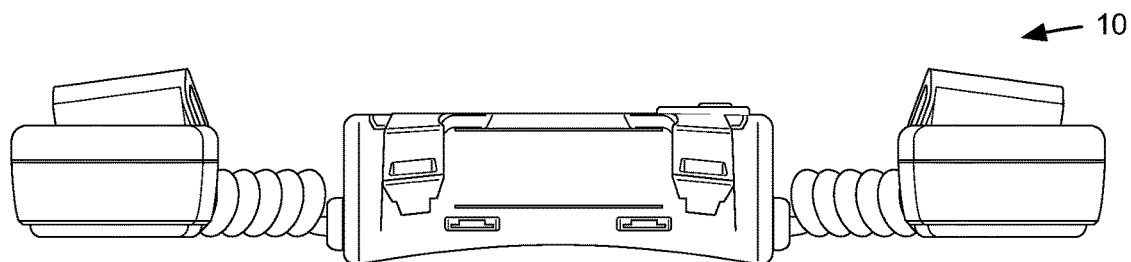
FIG. 15C is an elevation view from the front of an example of a bone conduction communication system.
Figure 15D:
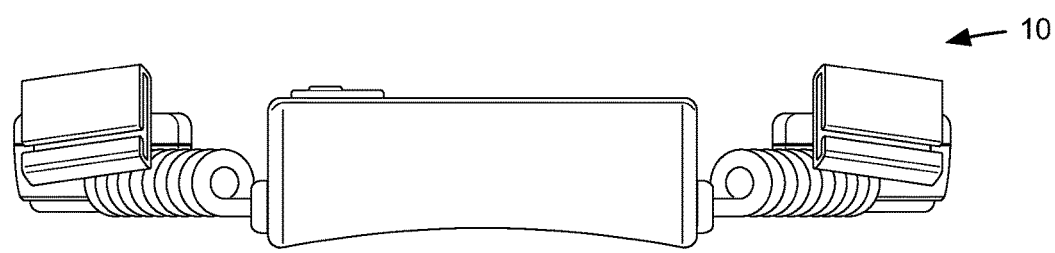
FIG. 15D is an elevation view from the back of an example of a bone conduction communication system.
Figure 15E:
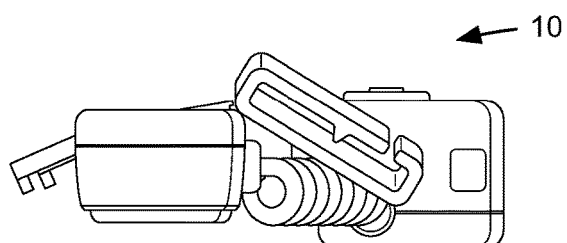
FIG. 15E is an elevation view from the right side of an example of a bone conduction communication system.
Figure 15F:
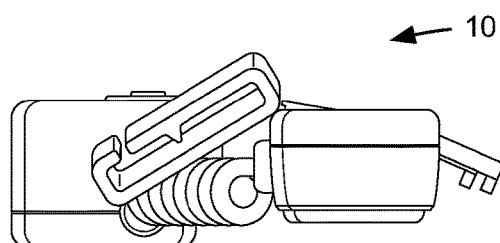
FIG. 15F is an elevation view from the left side of an example of a bone conduction communication system.
Figure 15G:
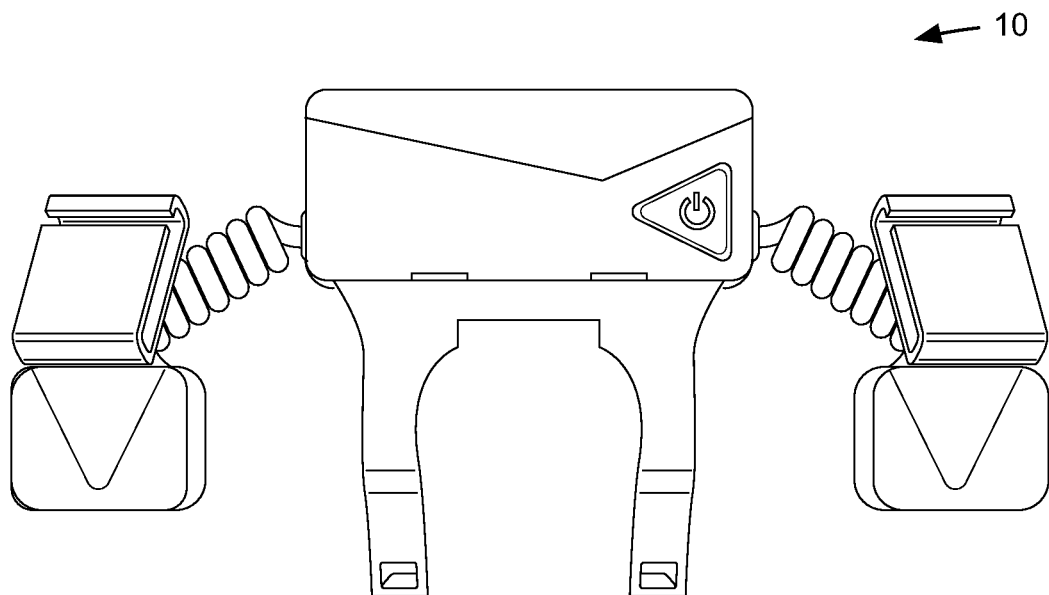
FIG. 15G is a plan view from the top of an example of a bone conduction communication system.
Figure 15H:
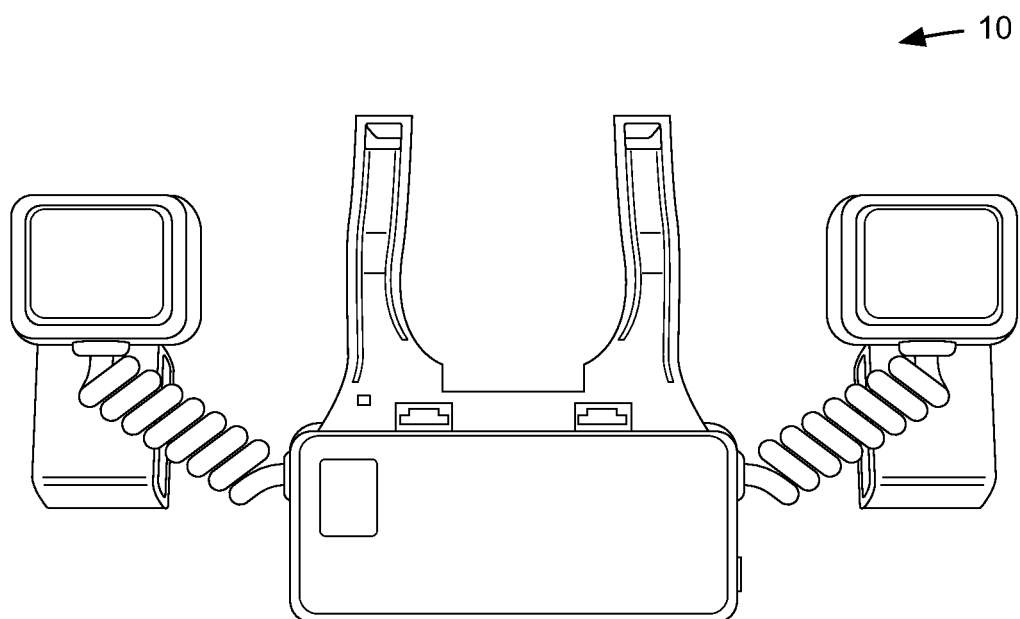
FIG. 15H is a plan view from the bottom of an example of a bone conduction communication system.

The relay 209 can function to interface between one or more communication means (e.g., broadcast type, broadcast channel, broadcast frequency, etc.), extend the range that communication signals can be sent and/or received, and/or can perform any suitable function. The relay is preferably mounted in a separate housing (e.g., separate structure, apart from the rest of the computing device); however, the relay can be any arranged in any suitable manner. In a specific example, the relay can include a handheld radio receiver (e.g., a walkie talkie) that is communicably coupled to the communication module (e.g., where the communication module is mounted on a head surface of a user). In a second specific example as shown in FIG. 13, the relay can include a user device (e.g., a mobile phone, smart phone, an application operating on a user device, etc.) that is communicably coupled (e.g., by a wire, by Bluetooth, etc.) to the communication module. However, the relay can be otherwise suitably arranged.

The power supply 202 functions to provide power to one or more components of the system (e.g., computing system, transducers, etc.). The power supply preferably includes a battery, but can additionally or alternatively can include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, a cord (e.g., to plug into another power source), and/or any other suitable power supply. The power supply can be charged (e.g., via a charging circuit 203) using a wire (e.g., via a plug) or wirelessly. However, the communication system can additionally or alternatively include any other suitable power source elements.

In a specific example, as shown in FIG. 3, the computing system can include a charging circuit, a battery, a Digital Signal Processor (DSP) (e.g., microprocessor (MP)), a digital-to-analog converter (DAC), an analog-to-digital converter (ADC), a wireless modem, and an antenna. The charging circuit can be either wireless or wired. In a variant of this specific example, the computing system can include a switch operable between a receiver position wherein a bone conduction transducer is connected to an input of the digital signals processor, and a transmitter position wherein each of the bone conduction transducers is connected to an output of the digital signals processor. However, the computing system can be otherwise suitably arranged.

3.3 Housing

The housing 300 preferably functions to support (e.g., hold) and/or protect (e.g., from water, from the environment, etc.) one or more of: the transducer(s), computing device(s), and/or any other suitable components. The housing can also function to couple (e.g., hold, secure, etc.) the transducers to a user (e.g., to a head surface of a user, such as via the wearable); however, the housing can perform any suitable function. The housing can be coupled to the wearable (e.g., at a wearable broad face of the housing) and to the user (e.g., at a user broad face of the housing); however, the housing can be otherwise suitably arranged. One or more components can be supported inside the housing, attached to the outside of the housing, offset from the housing (e.g., be mounted to a cantilever 305, mounted to a spring, etc.), and/or otherwise be attached to the housing.

The housing can retain and bias one or more transducers against the user, and can optionally retain the control system. The transducer can be arranged: outside of the housing (e.g., proud of the housing), flush with the housing side, recessed within the housing (e.g., behind the housing side), or otherwise arranged relative to the housing side. When the transducer is recessed within the housing, the system can optionally include vibration transmitters (e.g., rigid members with less than a threshold vibration and/or acoustic dampening) to transmit vibrations between the transducer and the housing.

The housing is preferably made of a polymer (e.g., thermoplastic); however, the housing can be made of metal (e.g., aluminium, stainless steel, etc.), glass, elastomers, and/or any suitable material. The housing can be flexible (e.g., configured to conform to a user's body) and/or rigid. The housing is preferably protected from solid particle insertion (e.g., from particles≥1 mm, ≥2.5 mm, ≥12.5 mm, ≥50 mm, etc. solid objects, dust protected, dust-tight, etc.). The housing is preferably waterproof (e.g., can operate after immersion in at least 1 m of water for at least 30 minutes. The housing preferably meets at least IP67 specification such as IP 68, IP 69, IP 69k, etc. However, the housing can meet IP65, IP 66, and/or have any suitable IP specification.

The housing 300 preferably includes one or more vibration dampener 303 (e.g., mechanical isolators). The vibration dampeners function to isolate the transducers from the housing. The vibration dampeners can additionally or alternatively function to decrease the extent of and/or prevent vibrations external to the user and/or system from transferring to the transducer, decrease the extent of and/or prevent leakage of audio signals into the users surrounding, decrease the amount of vibration signal that passes between transducers (e.g., directly such as vibration from one transducer causing vibrations to be detected in another transducer; indirectly such as vibrations from one transducer transferring to another transducer via a wearable, the user, etc.; etc.), and/or otherwise function. The vibration dampeners can be arranged on an inward facing surface of the housing, an outward facing surface of the housing, fill a portion of the volume of the housing, and/or be otherwise arranged. The vibration dampener is preferably arranged between the transducers and the wearable (e.g., on the wearable broad face of the housing, on a customizable attachment mechanism, etc.); however, the vibration dampener can be arranged between the transducers and the user (e.g., on a face of the housing proximal the user), between the transducer and the housing, and/or arranged in any suitable manner. The vibration dampener can be mounted to the housing (e.g., using adhesive, fasteners, fitted parts, etc.), integrated with the housing (e.g., built into the housing) and/or otherwise be coupled to the housing. The vibration dampener can surround a transducer, surround a portion of a transducer (e.g., all but one face or surface of the transducer, two or more faces or surfaces of the transducer, etc.), be adjacent to a single face or surface of a transducer, cover a portion (e.g., half of, a quarter of, etc.) one or more face or surface of a transducer, and/or be otherwise arranged.

The vibration dampener(s) 303 is preferably passive; however, the vibration dampener can be active, semi-active, and/or any suitable configuration. In variants where the vibration dampener is passive (e.g., passive isolator), the passive isolator can be one or more: flexible pads (e.g., made of rubber; cork; foam; laminate; elastomers such as silicone, neoprene, etc.; etc.), springs, wire rope isolators, and/or any suitable isolator. In an illustrative example, the shore hardness of the vibration dampener can be any value between about 0-100 on the A shore scale. However, the shore hardness can additionally or alternatively be rated on the D shore scale, the 00 shore scale, and/or otherwise be characterized. The vibration dampener can be any suitable thickness and/or range of thicknesses between about 0.01 to 1 cm and/or any suitable thickness. In a specific example, the mechanical isolator is a 1-3 mm thick silicone pad arranged between the transducer and the wearable; however, the mechanical isolator can be otherwise suitably configured. In a second specific example as shown in FIG. 8A, the housing can include a vibration dampener such as a 1 mm thick silicone pad arranged within a housing (or compartment) between the housing and the transducer (e.g., on an inward facing surface of the housing). However, the vibration dampener can additionally or alternatively include structural isolators (e.g., honeycombs, different materials, adhesive interfaces, etc.), shaped surfaces (e.g., one or more interior surface of the housing can be roughened, shaped to reduce the transmission of sound or vibrations), and/or include any suitable vibration dampener.

The vibration dampener preferably has a vibration dampening ratio that is at least 0.1 such as 0.2, 0.3, 0.4, 0.5, 0.6, 0.7, 0.8, 0.9, 1, 1.2, 1.5, 1.7, 2, 3, 5, 10. However, the vibration dampening ratio can be less than 0.1, greater than 10, and/or have any value. The vibration dampener preferably has a substantially flat dampening response (e.g., less than 5%, 10%, 20%, 30%, etc. difference between transmission at a highest transmission frequency and a lowest transmission frequency), but can have a tailored dampening response (e.g., have a designed transmission frequency response such as to more strongly dampen one or more frequencies than other frequencies) and/or have any frequency response. The vibration dampener preferably has a resonance frequency outside the operation frequencies of the transducers, but can have a resonance frequency within the operation frequencies of the transducers, a resonance frequency less than 400 Hz (such as 1 Hz, 5 Hz, 10 Hz, 20 Hz, 50 Hz, 100 Hz, 200 Hz, 300 Hz, etc.), greater than 8000 Hz, between 400 Hz and 8000 Hz, and/or any resonance frequency. In some variants, the thickness, shore hardness, and/or material type of the vibration dampener can be selected to ensure that one or more of these preferred properties are achieved. However, the vibration dampener can be otherwise configured or selected to achieve these properties and/or can be configured to have any property(s).

The housing can optionally include vibration couplers (e.g., vibration transmission elements), which function to facilitate transmission of vibrations between the user and the transducer. The vibration couplers can additionally or alternatively function to adaptively and/or comfortably coupled the system to a user. The vibration couplers are preferably arranged between the transducers and the head region of the user, but can be otherwise arranged. The vibration couplers can be the vibration dampener, structures, springs, acoustically matched materials (e.g., with an acoustic resonance similar to that of a user's head or body), a vibration radiators (e.g., vibration plates such as rigid thermoplastic material), and/or any suitable vibration transmission elements can be used. In variants where the vibration coupler material is the same as the vibration dampener material, the shore hardness of the vibration coupler material can be greater than, less than, or the same as the shore hardness of the vibration dampener material. The surface area of the vibration couplers (e.g., vibration plate) is preferably larger than the surface area of the transducers. However, the surface area of the vibration couplers can be the same as and/or smaller than the surface area of the transducers. In an illustrative example, when a square transducer has a surface area of 100 mm$^2$, the vibration plate can have a surface area of 400 mm$^2$. However, the vibration coupler can have any suitable surface area. The vibration couplers are preferably centered over the transducer (e.g., transducer is proximal a central region of the vibration couplers). However, the transducers can be proximal an edge, corner, and/or otherwise located relative to the vibration couplers.

In a specific example as shown in FIG. 8A, the housing can include a vibration coupler such as an at most 0.5 mm thick silicone pad between a transducer and a head surface of a user (e.g., on an outward facing surface of the housing) and a vibration plate (e.g., a thermoplastic material with dimensions comparable to a housing dimension) between the transducer and the silicone pad. However, any vibration coupler can be used.

The housing 300 preferably includes one or more attachment mechanisms 307. The attachment mechanisms can function to couple the housing to the wearable. The attachment mechanisms preferably reversibly connect to the wearable and to the housing; however, the attachment mechanism can irreversibly connect to the housing, irreversibly connect to the wearable, can be an integrated piece of the housing, can be an integrated piece of the wearable, and/or be otherwise suitably configured. One or more attachment mechanisms can be used in parallel and/or series.

The attachment mechanism 307 is preferably arranged on the opposing side of the housing relative to a transducer; however, additionally or alternatively, the attachment mechanism can be arranged on the same side of the housing, on an adjacent side of the housing, and/or on any suitable side of the housing relative to the transducer.

The attachment mechanism 307 can be a clip, snap-fit, adhesive, tie, hook-and-fastener, magnetic, sliding latch (e.g., mated latches), spring, fitted/mated pieces, slip lock, and/or any suitable mechanism. The attachment mechanism can be connected to the wearable in the same manner that it is connected to the housing; however, the attachment mechanism can be connected to the wearable and the housing in different manners. In a specific example, the attachment mechanism can slide onto the housing and can clip on to the wearable (e.g., a strap on the wearable); however, the attachment mechanism can be otherwise suitably arranged.

The housing can include one or more separate structures. Each structure can hold one or more components. The structures are preferably flexibly connected to each other (e.g., using coiled wire 309, spring, elastic cord, etc.); however, the structures can be rigidly connected, separate such as wirelessly coupled, and/or otherwise suitably arranged. In variants, the vibration microphone and vibration transmitter are preferably located in separate structures; however, additionally or alternatively, the vibration microphone and vibration transmitter can be located in separate compartments of the same structure, in the same structure, and/or be otherwise suitably arranged.

Each structure can be a unified unit (e.g., a contiguous manufactured piece) and/or can include one or more detachable segments (e.g., to facilitate charging, repair, part swapping, etc.). Detachable segments can be coupled to one another using adhesives (e.g., glue, solder, etc.), fasteners (e.g., screws), clips, mated parts (e.g., a first segment that has a female end and a second segment that has a male end), and/or can be otherwise coupled to each other. Each segment can have nay suitable size or shape (e.g., to contain one or more component of the system). In an illustrative example, the central compartment can include two segments, where a power supply can be in a first segment of the compartment and a transducer can be in the second segment of the compartment. In this illustrative example, the first segment can be configured to be removed from the second segment, which can facilitate changing a depleted power supply and replacing it with a separate power supply without taking off the bone conduction communication system or the wearable. In this illustrative example, the second segment is preferably, but does not have to be, mounted to the wearable. However, any compartment can include any suitable number of segments.

In a first specific example as shown in FIG. 8A, one structure (e.g., a central structure) can hold a computing device. In this specific example, two secondary structures can be connected to the central structure by a length of coiled wire (e.g., retractable cord). Each of the two secondary structures can hold a bone conduction transducer (e.g., one transducer per secondary structure).

In a second specific example as shown in FIG. 8B, one structure (e.g., a central structure) can hold a computing device and a bone conduction receiver. In this specific example, two structures can be connected to the central structure by a length of coiled wire (e.g., retractable cord). Each of the two structures can hold a bone conduction transmitter. In this specific example, the bone conduction receiver can be mounted to a cantilever connected to the central structure.

In a third specific example, the housing can include a single structure. The housing can be substantially auriform (e.g., a truncated auriform, shaped like the helix of a user's ear, shaped like a human auricle, shaped like the base of a user's ear, etc.). In this specific example, the housing can be flexible to enable a user to adjust the fit of the housing to their specific geometry (e.g., around their specific ear). However, the housing and/or structures can be otherwise suitably configured.

The housing and/or structures are preferably arranged (e.g., via the attachment mechanism) at an angle relative to the wearable; however, the housing can be parallel to the wearable. The angle can be defined relative to a housing reference axis and a wearable reference axis. The housing reference axis can be a surface normal to a side of the housing, an edge of the housing, an inertia axis of the housing, and/or any suitable reference axis. The wearable reference axis can be a direction of motion for a user to put on the wearable, an axis normal to the surface of the wearable, an axis parallel to the surface of the wearable, and/or any suitable axis.

3.4 Wearable

The optional wearable 400 (e.g., user attachment mechanism) can function to hold (e.g., mount, anchor, secure, etc.) the transducer(s) (e.g., via a housing) on the user. The wearable can cover a head region of the user, where the system and/or any component thereof can cover a subregion of and/or proximal to the head region. However, the wearable can be worn on any region of a user's body. The wearable preferably supports the transducers rigidly (e.g., without allowing significant movement of the transducers); however, the wearable can support the transducers loosely, and/or can support the transducers in any suitable manner. The wearable preferably includes a strap that functions to secure the wearable to the user, but the wearable can include any suitable coupling mechanism for mounting to the user. The strap can additionally or alternatively function to adjust a bias force between the transducer(s) and the user. The wearable is preferably connected to the housing (e.g., via an attachment mechanism coupled to a strap of the wearable), but the wearable can be connected to the system in any manner. The housing (or parts thereof) is preferably on an inside surface of the wearable (e.g., the surface of the wearable that normally touches the user; proximal surface; user-facing surface; interior surface; etc.); however, the housing (or parts thereof) can be on the outside surface of the wearable, and/or at any suitable location. The size of the wearable (and/or a strap thereof) is preferably adjustable (e.g., elastic, resizable, etc.); however, the size of the wearable can be fixed. In a specific example, the total strap size (e.g., length of the strap without tension or adjustment) can be any suitable length or range thereof between about 10 cm to about 75 cm, However, the strap size can be less than 10 cm or greater than 75 cm.

The housing can optionally include adjustment controls. The adjustment controls can function to ensure that the housing fits securely and comfortably on the user. The adjustment controls can additionally or alternatively function to adjust a bias force between the transducer(s) and the user (for example, by increasing or decreasing a strap length, by modifying a spring constant, by modify a cantilever stiffness, by modifying a cantilever angle, etc.). The adjustment control is preferably attached to and/or integrated in the strap, by can be mounted to the wearable, a housing, run in an application on a computing system, and/or otherwise be arranged. The adjustment controls can include a ratchet mechanism, cam(s) (e.g., translational cam(s) such as 1 mm, 2 mm, 5 mm, etc. in any suitable direction(s); rotational cams such as to provide 1°, 5°, 10°, etc. of rotation about any suitable reference axes such as the axis defined by an ear canal of a user, an axis aligned with a broad face of the structure, an axis orthogonal to the head surface of the user, etc.; etc.), slides, loops, ladder locks, inch locks, ring, hooks, and/or any suitable adjustment controls.

The wearable can include: a helmet (e.g., safety helmet such as construction helmet, mining helmet, scuba helmet, astronaut helmet, firefighter helmet, hard hat, etc.; athletic helmet such as bicycle helmet, football helmet, motorcycle helmet, racing helmet, etc.; military helmet; etc.), eyewear (e.g., glasses, goggles, safety goggles, sunglasses, smart glasses, etc.), mask (e.g., gas mask, medical mask, etc.), clothing (e.g., scarf, headband, bandana, etc.), surgical scrubs, accessories (e.g., necklace, earring, tiara, etc.), examples as shown in FIGS. 5A-5E, and/or any suitable wearable.

In a specific example of the system, as shown in FIGS. 2A, 2B, 6, 14A-14C, and 15A-15H, the system can include three housing structures; a central structure and two side structures. The central structure preferably includes a computing device and a vibration receiver (e.g., bone conduction microphone). The vibration receiver is preferably aligned to a broad face (e.g., a transducer axis, such as the primary transducer vibration axis, is parallel to the surface normal of the broad face) of the central structure (e.g., receiver broad face). The vibration receiver can be a crystal transducer. The central structure can include an attachment mechanism (e.g., clip, configured to connect the central structure to a wearable, etc.) arranged on a central structure broad face (e.g., central attachment broad face) opposing the receiver broad face. The two side structures can be attached to opposing sides (e.g., opposing central broad faces adjacent to the attachment broad face and to the receiver broad face) of the central structure by coiled wire. The coiled wire can be approximately 20 cm long (e.g., coiled length, fully extended length, etc.). Each of the side structures can include a vibration transmitter (e.g., bone conduction speaker) that is aligned to a broad face (e.g., a transducer axis, such as the primary transducer vibration axis, is parallel to the surface normal of the broad face) of the side structure (e.g., transmitter broad face). Each of the vibration transmitters can be electromechanical transducers. Each of the side structures can include an attachment mechanism (e.g., clip, configured to connect the side structure to a wearable, etc.) arranged on a broad face of the side structure (e.g., side attachment broad face) opposing the transmitter broad face. In this specific example, the structures can be connected to a wearable (e.g., via strap(s) of the wearable) by the attachment mechanisms (e.g., central attachment mechanism, each of the side attachment mechanisms). The attachment mechanisms are preferably configured to hold the structures on the inside surface (e.g., the surface that will touch the user) of the strap. The structures are preferably arranged such that the transducer broad faces (e.g., receiver broad face, transmitter broad face) are directed in substantially the same direction as the inside surface of the strap (e.g., directed toward the user, angle between the user and the transducer broad face is less than 10°, etc.). Each of the structures preferably include an approximately 2 mm thick piece silicone (e.g., mechanical isolator) arranged between the structure and the wearable. Each of the structures can include a piece of silicone arranged on the transducer broad face (e.g., the face of the structure that can be in contact with the user). The computing device can be coupled to a remote relay device (e.g., a walkie-talkie).

In this specific example, when the wearable is put on by the user, the straps can be arranged such that the user pushes the structures outward. This can ensure that the structures are under tension that can help hold the structures against the user. Each of the structures and/or the wearable can include adjustment controls that are configured to adjust the tension of the structures against the user, to enable readjust of the orientation of the structures relative to the user (e.g., for comfort, to improve coupling of the speaker to the ear surface, etc.), and/or are otherwise suitably configured.

Figure 4:
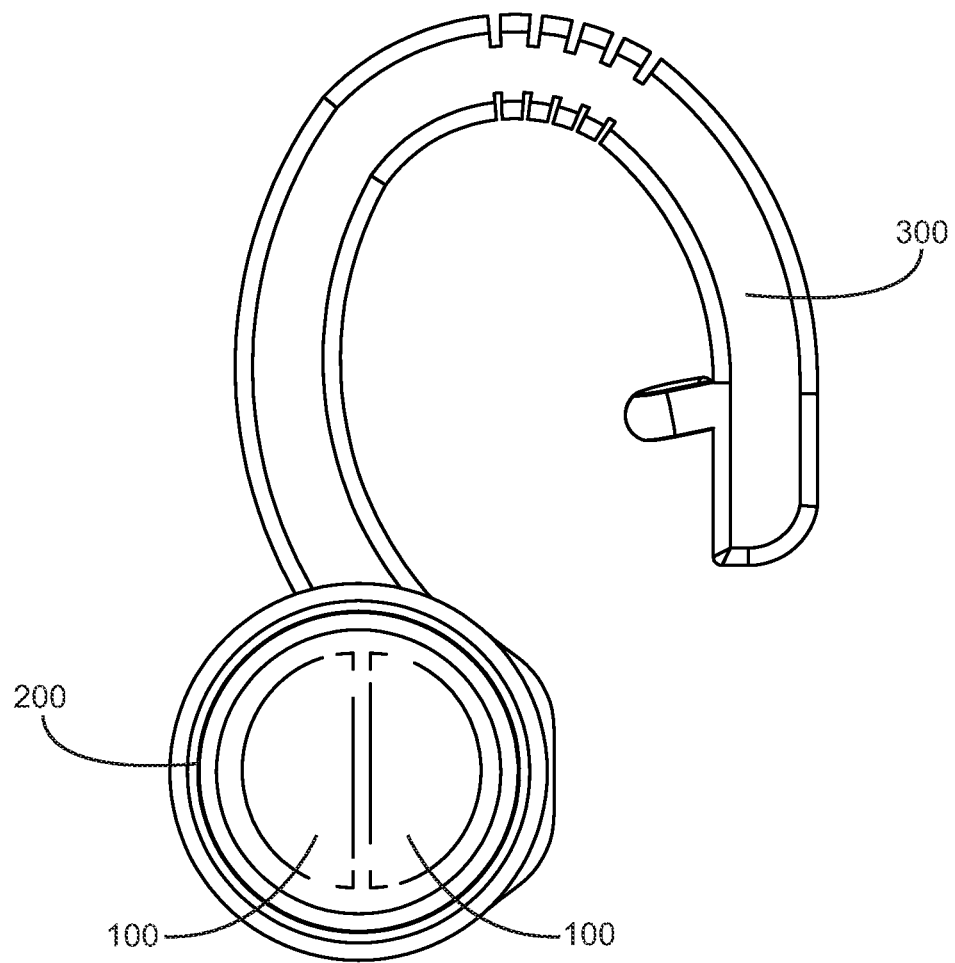
FIG. 4 is a schematic representation of an embodiment of the system.
Figure 5A:
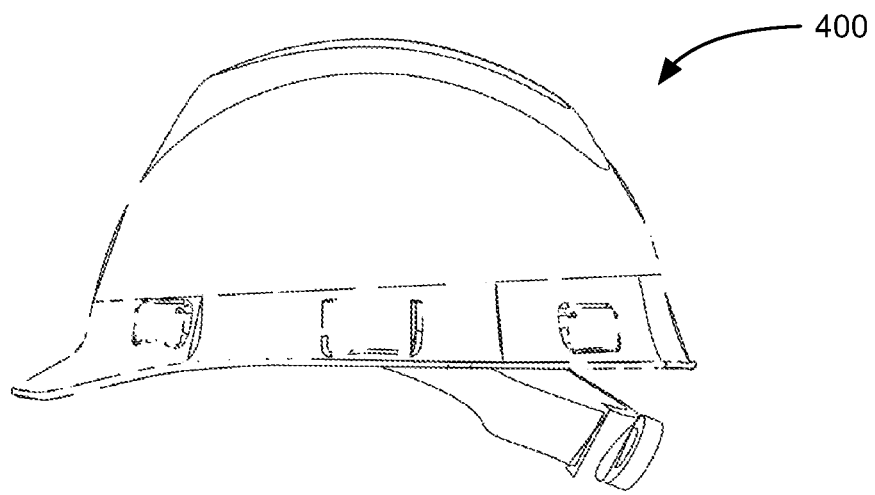
FIGS. 5A-5E are schematic representations of examples of wearables.
Figure 5B:
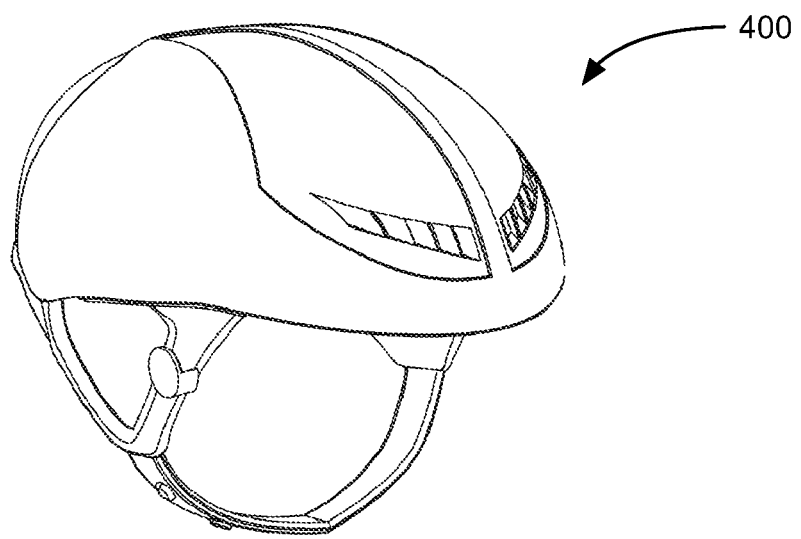
Figure 5C:
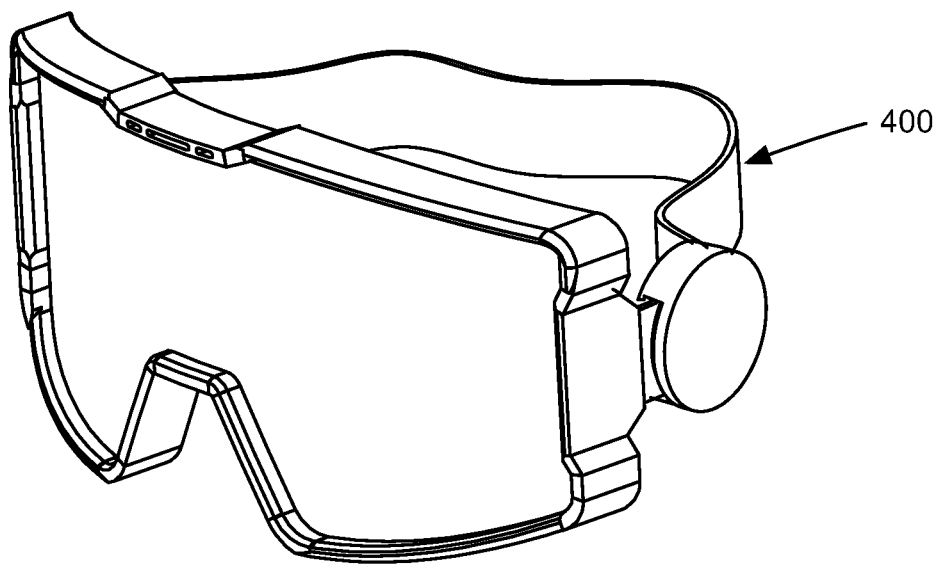
Figure 5D:
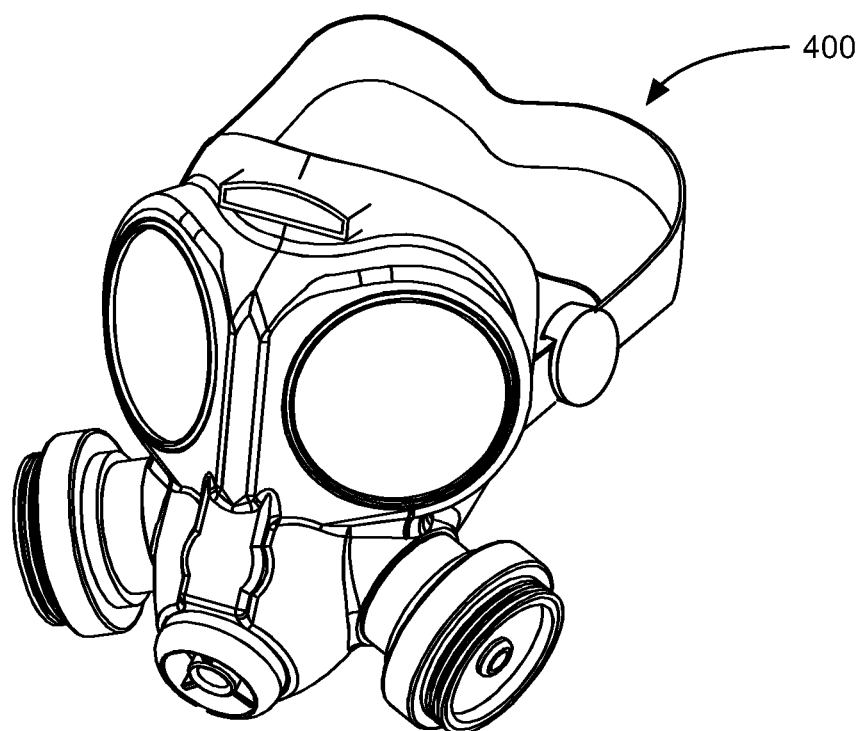
Figure 5E:
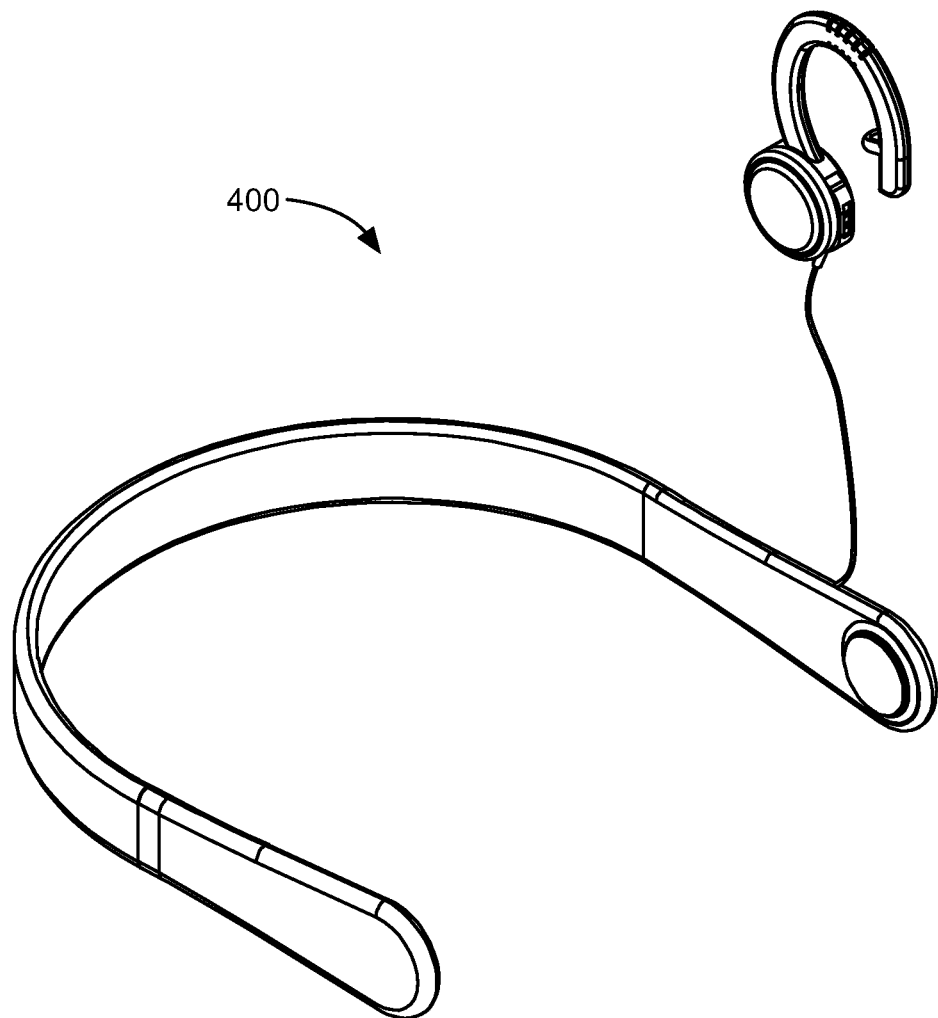
Figure 6:
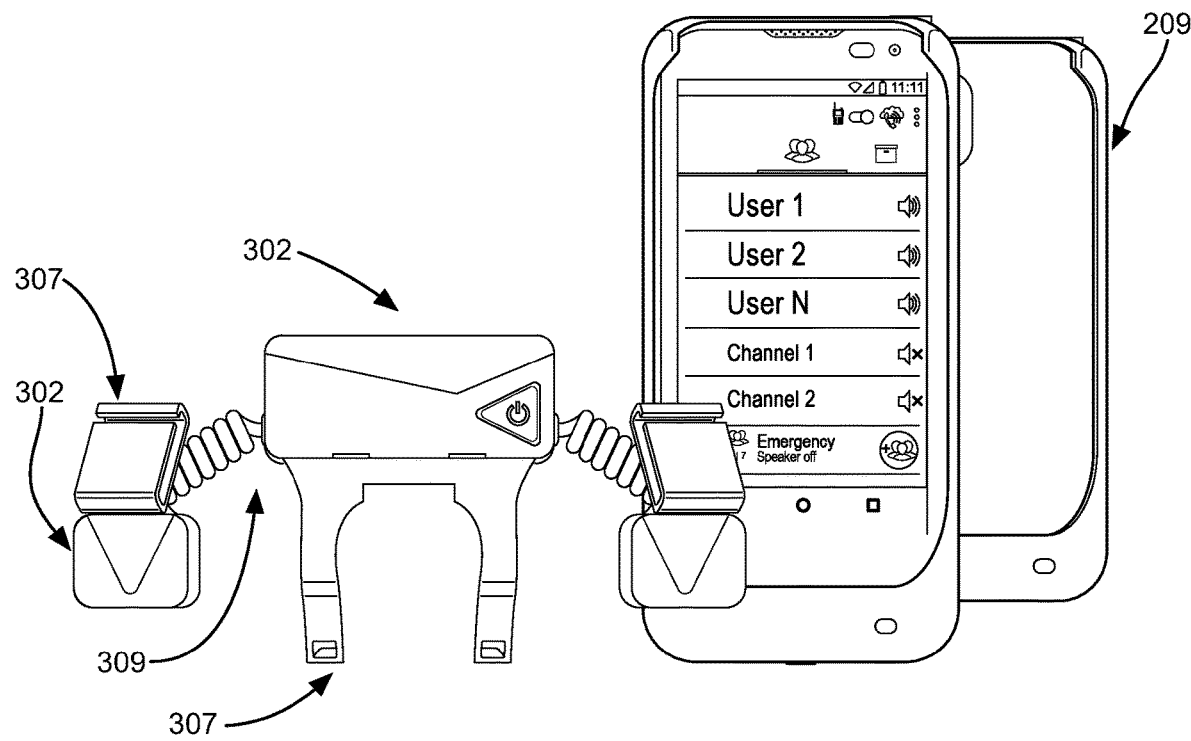
FIG. 6 is a schematic representation of an embodiment of the system.

In a second specific example, as shown in FIG. 4, the system can include a housing (e.g., an electronics enclosure) with a substantially auriform shape. The housing can include an ear loop and an ear inset. The vibration transmitter and vibration microphone can be located within the housing. The vibration transmitter and vibration microphone can be isolated from each other by a vibration insulator. In this specific example, the vibration microphone and vibration transmitter can be crystal transducers. Additionally, the housing can include the computing system and a rechargeable battery. However, the system can be arranged in any suitable manner.

In a third specific example, the vibration transmitter can be located on the head (e.g., located behind an ear such as on the mastoid process bone). The vibration microphone can be located on the neck and/or in proximity to the throat (e.g., in an integrated neckband, coupled to a user's clothing, etc.). The vibration transmitter and vibration microphone can be or connected wirelessly using a low energy wireless transmitter such as Bluetooth or Near Field Communication (NFC).

4. Method

As shown for example in FIG. 9, the method 20 can include establishing a communicable connection S210, operating the communication system in a first mode S220, comparing an audio signal to a threshold S230, operating the communication system in a second mode S240, and/or any suitable steps. The method preferably functions to operate a bone conduction communication system (e.g., one or more transducers of a bone conduction communication system), such as the system described above, but can be used to operate any communication system or components thereof. The method and/or steps thereof can be performed using analogue (e.g., an integrated circuit) and/or digital (e.g., an application operating on a processor) electronics. The method and/or steps thereof are preferably performed locally (e.g., at each communication system), but can be performed in a distributed manner (e.g., between a cloud computing system and a local computing system) and/or remotely (e.g., in a cloud computing system). The method and/or steps thereof can be performed in a manner that is tailored to a user (e.g., based on one or more user characteristics, user preferences, etc.), the same for all users, the same for all users with common or similar user characteristics, different for each user, and/or performed in any manner. Examples of user characteristics include: age, gender, location, background noise level, background noise type, job title, user language, user cultural heritage, work, job title, activity, and/or any suitable characteristics. The method is preferably performed contemporaneously and/or synchronously across each communication system in a communicable connection, but can be performed asynchronously and/or with any suitable timing.

Establishing a communicable connection S210 functions to communicably couple two or more communication systems to facilitate communication between the users associated with the communication systems. The communicable connection preferably functions to enable audio signals to be transmitted between communication systems (e.g., users in the communicable connection). The communicable connection can be public (e.g., any user who knows the frequency, channel, identification, etc. can join) and/or private (e.g., requires a key, permission, a unique identification code, etc.). Each communication system in the communicable connection can be the same or different. The communicable connection is preferably provided over any protocol supported by a communication module and/or relay (e.g., WiFi, LAN, wired, Bluetooth, Radio, Zigbee, cellular, satellite, etc.). However, any communication protocol can be used.

The communicable connection can be established automatically (e.g., when a signal strength at a communication system exceeds a signal strength threshold, upon system activation, etc.), manually (e.g., responsive to a user input, responsive to user permission acceptance, etc.), and/or be otherwise established. One or more communication systems (associated with their respective users) can be added and/or removed from (voluntarily or involuntarily) with any suitable timing and/or upon satisfaction of any suitable condition (e.g., timeout, maximum number of systems on the channel reached, respective connection stability, predetermined prioritization, etc.). In some variants the communicable connection can be associated with a geographic region (e.g., geolocation such as a building, neighborhood, city, job site, etc.). However, the communicable connection can be configured in any manner.

S210 can include positioning and/or orienting the communication system. The communication system can be mounted to a head surface of the user. In specific examples, one or more transducers can be positioned on (e.g., in contact with skin directly above) or proximal to a cranial bone (e.g., occipital bone, parietal bone, frontal bone, temporal bone, sphenoid bone, ethmoid bone, etc.), a facial bone (e.g., a mandible, zygomatic, maxilla, nasal, etc.), thorax bone, and/or any suitable bone of the user. In variants including more than one transducer, the transducers are preferably substantially symmetrically distributed about a reference axis or plane of the user but can be asymmetrically distributed. The transducers are preferably coupled to the user by a wearable (e.g., a strap of a wearable), but can additionally or alternatively be coupled to the user using an adhesive, suction, a mechanical fastener (e.g., a hair clip, needle, piercing, pin, screw, etc.), and/or otherwise be coupled to the user. The transducers are preferably oriented substantially perpendicular (e.g., ±1°, ±5°, ±10°, etc.) to the body region of the user, but can be oriented substantially parallel (e.g., ±1°, ±5°, ±10°, etc.) and/or have any orientation. The communication system can be positioned manually, automatically (e.g., using passive systems, such as foam padding or elastic straps; using active systems, such as closed-loop force or acoustic feedback contact adjustment), or otherwise positioned.

Operating the communication system in the first mode S220 preferably functions to establish operation settings for the communication system and/or components thereof. The operation settings can include: gain, frequency response, mode of operation, number of active transducers, sensitivity, and/or any suitable settings. The operation settings can depend on the communicable connection, the user (e.g., user preferences), the users of the communicable connection, background noise (e.g., from an environment proximal the user, from an environment proximal other users), preselected settings (e.g., default settings), the communication system (e.g., type of transducers, operation of the transducers, transducer or communication system placement on the user, etc.), and/or any suitable characteristics. S220 can be performed at the same time as S210 (e.g., the operation of the communication system can be set when the communication system enters the communicable connection), before S210, and/or after S210 (e.g., to update the operation settings of the communication system). The operation settings can be fixed (e.g., hardwired, permanent, for the duration of the communicable connection, etc.) and/or adjustable (e.g., updated by the user, updated based on changes in an environment of the user, modified responsive to a user preference, changed based on the communicable connection, etc.). In a preferred embodiment, each communication system is by default operable in an input mode. In the input mode, one or more transducer of the communication system is preferably operable as a receiver, i.e., to detect vibrations (e.g., associated with a user speaking, such as vibrations of air, bones, cartilage, muscle, skin, vibration insulation, housing, etc. near or in contact with the transducer) and convert said vibrations into an electrical signal representative of sound. However, the transducers can be otherwise operable in the input mode. However, one or more communication system can be default operable in an output mode (e.g., as a transmitter i.e., to output an electrical signal as a vibration to air, bone, muscle, skin, vibration insulation, housings, etc. near or in contact with the transducer), and/or can by default operate in any mode or manner.

Each communication system (e.g., in the communicable connection) can transmit all generated audio signals (e.g., signals, background, noise such as ambient noise; electrical noise; associated with a biological vibration of the user such as a heart beat, breathing, sneezing, coughing, etc.; etc.), audio signals that can be associated with a vibration, audio signals that can be associated with a speech, audio signals that are approved and/or selected by a user (e.g., only signals when a user operates a transmission selector), signals that exceed a transmission threshold (e.g., a duration, frequency, bandwidth, amplitude, voice activity detection threshold, etc.) and/or any suitable audio signals. The audio signals are preferably transmitted to all other communication systems in the communicable connection, but can be transmitted to a subset of users (e.g., selected by the speaker, based on a channel or specific frequency within the communicable connection, etc.), a database, and/or to any suitable users and/or endpoints.

Comparing the audio signal S230 to a threshold preferably functions to detect when a user within the communicable connection (e.g., channel) is speaking, to separate communication from noise, and/or otherwise function. S230 can be performed continuously, at predetermined times (e.g., at a predetermined frequency), randomly, responsive to a trigger, and/or with any suitable timing. The thresholds are preferably compared to received audio signals (e.g., function as a threshold for whether to present the audio signal to a listener), but can additionally or alternatively be applied to transmitted (or queued to transmit) audio signals and/or any suitable audio signals. As such, the thresholds are preferably compared at each communication system (e.g., a computing system of each communication system) within the communicable connection (e.g., including or excluding the transmitting communication system). However, the thresholds can additionally or alternatively be compared at a cloud computing system, a central computing system, the transmitting communication system (e.g., be a threshold for transmitting the signal to one or more listeners), and/or be compared by any component.

The threshold can depend on an ambient noise level proximal the speaker, an ambient noise level proximal the listener, depend on user preferences, operation parameters, an urgency of the communication, depend on the speaker, depend on the listener, and/or depend on any suitable characteristics.

The threshold can be static or dynamic threshold. The dynamic threshold can be discrete (e.g., a high noise threshold, medium noise threshold, low noise threshold, etc.) or continuous. In an illustrative example, a higher threshold can be set when the speaker (and/or listener) is in or near an environment with a high ambient noise (e.g., ≥40, ≥50, ≥60, ≥70, ≥80, ≥90, ≥100, etc. dB) and a lower threshold can be set when the speaker (and/or listener) is in or near an environment with a low ambient noise (e.g., ≤30, ≤40, ≤50, ≤60, ≤70, ≤80, etc. dB). In some embodiments, the threshold, particularly but not exclusively a dynamic threshold, can be determined according to an equation, model, user feedback (e.g., speaker, listener), user preferences, historical usage data, machine learning, a user input, and/or other be determined.

The threshold can be a signal strength (e.g., a voltage, power, current, etc. of the audio signal), a signal duration, a signal bandwidth, a signal frequency, a signal spectrum, and/or any suitable threshold. The threshold can be an absolute or relative value. In a first specific example, the threshold can correspond to a voltage threshold such as <0.1, 0.1, 0.2, 0.3, 0.5, 1, 2.5, 2, 3, 4, 5, 10, 20, 30, 50, 100, 200, 300, 400, 500, 1000, 2000, 3000, 5000, >5000 mV. In a second specific example, the threshold can correspond to a decibel threshold such as <0.3, 0.3, 1, 2, 3, 5, 10, 20, 30, >30 dB. However, any suitable threshold can be applied used. The threshold can be a lower limit, upper limit (e.g., to prevent signals that can damage components, causing pain and/or otherwise discomfort or irritate a listener, etc.), an acceptable range of signals (e.g., be have an upper and lower limit for signals), and/or otherwise characterize the signals.

Operating the communications systems S240 preferably functions to operate communications systems corresponding to listeners in a second mode, but can additionally or alternatively function to operate communications systems corresponding to speakers in a second mode and/or otherwise function. S240 is preferably performed after S230, but can be performed at the same time as or before S230. The listener communication systems are preferably operable in the second mode when the received audio signal is greater than or equal to the threshold (e.g., from S230), but can additionally or alternatively be operable when the audio signal is within a threshold range, is less than or equal to the threshold, and/or otherwise be operable. When a user in the second mode is speaking, the audio signals associated with the user's speech are preferably not transmitted (e.g., most or all audio signals produced when the user is in the second mode are not transmitted to the communicable link). However, additionally or alternatively, when a user in the second mode is speaking, that user can be placed in a queue to speak next (e.g., that user can be the next in line to transition to the first mode), the user's audio signals can be stored (e.g., in a buffer), the user can assume the speaker role (e.g., based on an urgency of communication, based on an authority of the user, etc.), and/or the listener can otherwise be transitioned to a speaker role (e.g., from the second mode to the first mode) and/or transmit audio signals. The listener communication systems are preferably automatically switched to the second mode, but can be semi-automatically, manually, or otherwise be switched. The second mode is preferably an output mode, where the transducers of the listener communication system are operable to output a vibration associated with the received audio signal. However, the second mode can be any mode.

Figure 10:
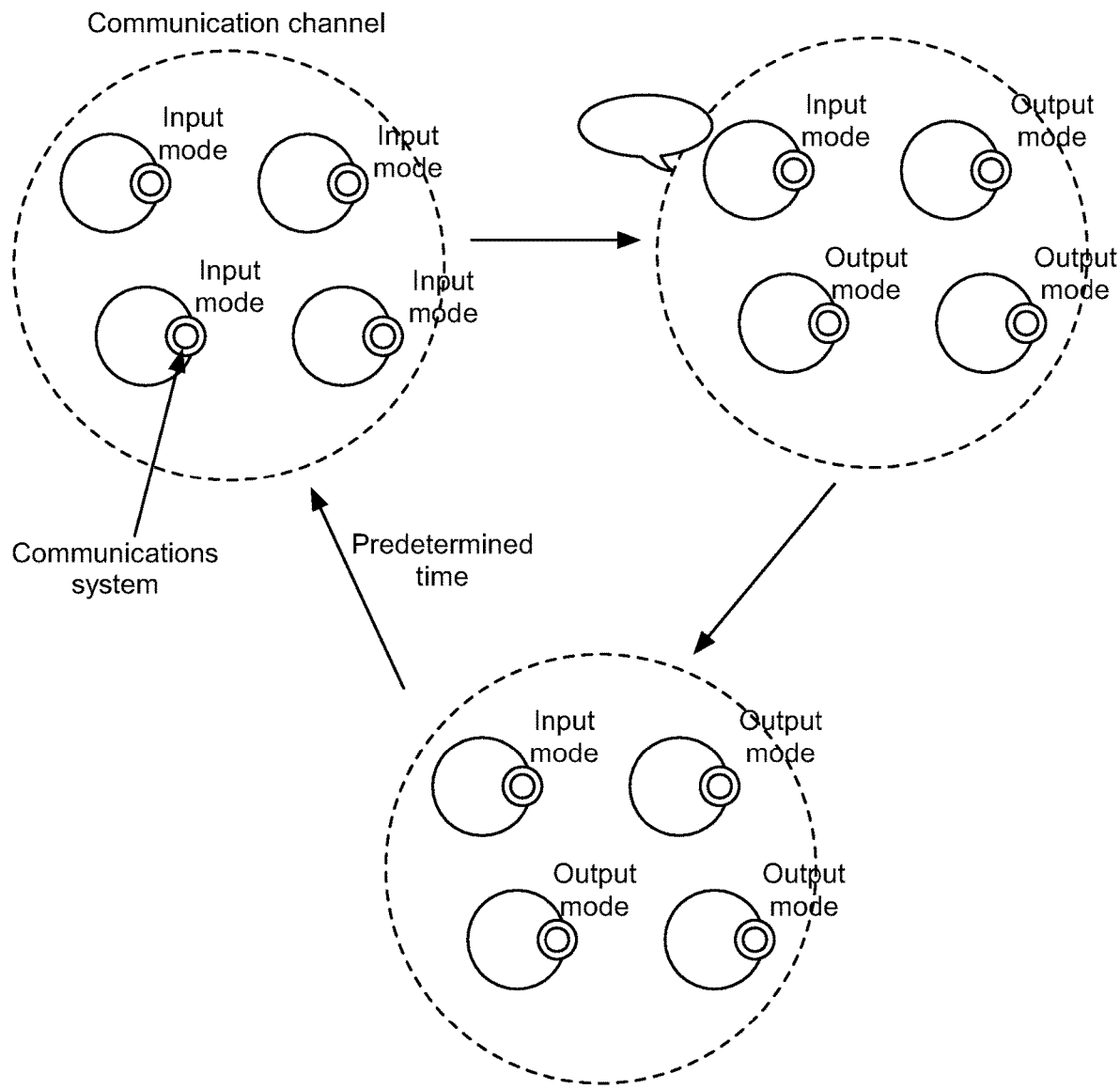
FIG. 10 is a schematic representation of an example of a plurality of users in a communication channel and switching the mode of operation of the communication system of each user.
Figure 11:
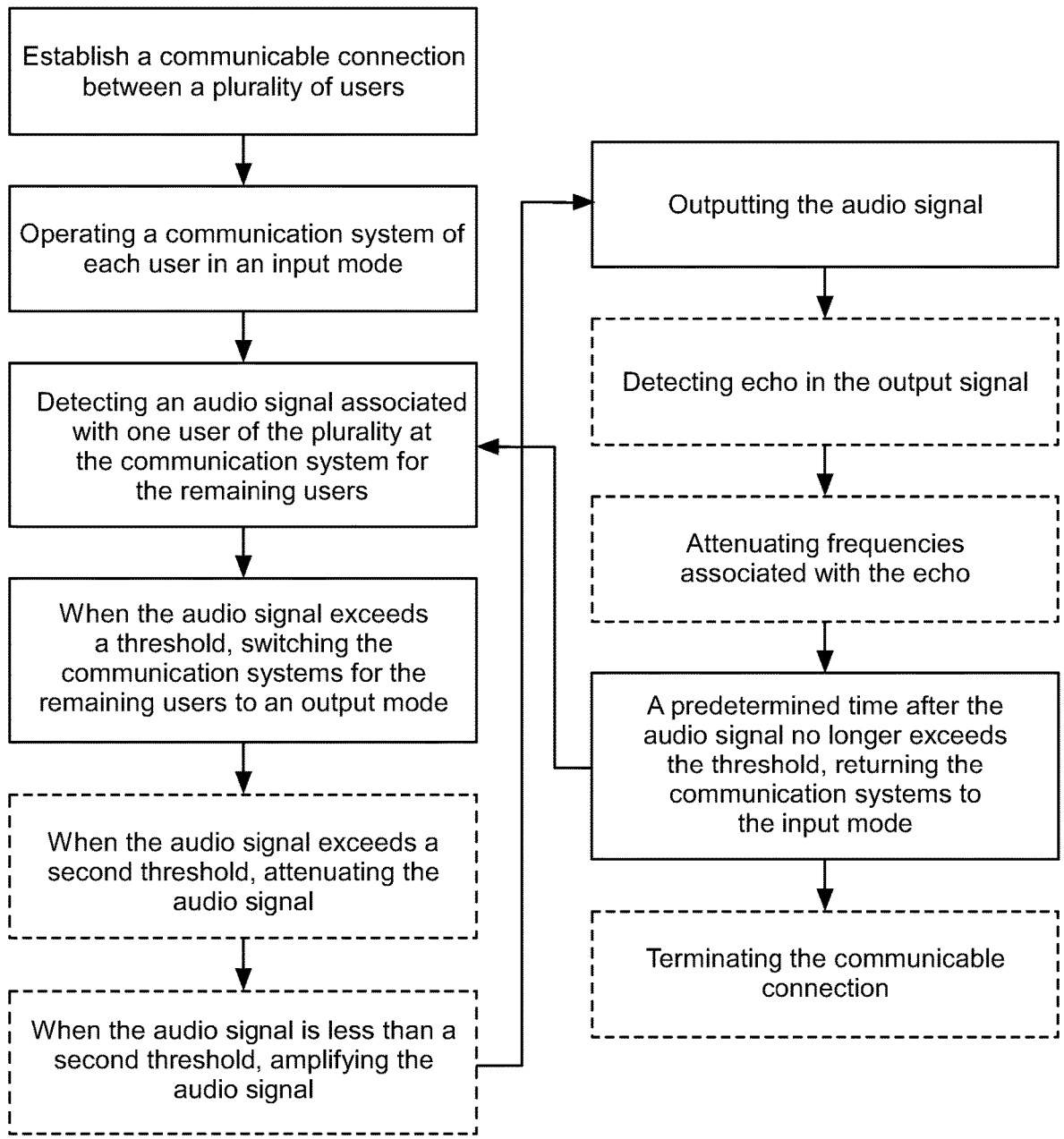
FIG. 11 is a schematic representation of an embodiment of using a bone conduction communication system.

As shown for example in FIG. 10, the listener communication systems are preferably operable in the second mode until the audio signal does not meet the threshold criterion for a predetermined time duration, but the listener communication systems can be operable in the second mode indefinitely, until an audio signal associated with the listener exceeds a threshold (e.g., the listener becomes a speaker), for a predetermined time duration, and/or otherwise operate in the second mode. The predetermined time duration is preferably any value and/or range thereof between about 1-5000 ms such as 7 ms, 10 ms, 20 ms, 50 ms, 100 ms, 200 ms, 300 ms, 400 ms, 500 ms, boo ms, 750 ms, 1000 ms, 1500 ms, 2000 ms, 3000 ms, or 4000 ms. However, the predetermined time duration can be less than 10 ms or greater than 5000 ms. The predetermined time duration is preferably static, but can be dynamic. The predetermined time duration can depend on user characteristics (e.g., user language, user cultural heritage, work, age, gender, etc.), the communication system, the speaker, the listener, a user preference, a user input, and/or any characteristics.

In some embodiments of the invention, the listener communication system can compare the audio signal to a second threshold, which can function to determine (e.g., modify) a volume or amplitude of the audio signal. The second threshold is preferably listener specific, but can be the same for a subset or all listeners. The second threshold can be the same as the threshold from S230; however, the second threshold can be higher than or lower than or unrelated to the threshold form S230. The audio signal and/or operation parameters are preferably modified based on the comparison of the audio signal to the second threshold. For example, when the audio signal is greater than the second threshold, the communication system gain can be decreased and/or the audio signal can be attenuated (e.g., digitally, by an attenuator, etc.). Similarly, when the audio signal is less than the second threshold, the communication system gain can be increased and/or the audio signal can be amplified (e.g., digitally, by an amplifier, etc.). The modification preferably depends on the relative value between the audio signal and the second threshold, but can be a fixed value, depend on the absolute value of the audio signal, and/or otherwise be determined. Examples of modifications include: amplification (at all or a subset of audio signal frequencies), attenuation (at all or a subset of audio signal frequencies), distortion correction, delaying signals (or components of the audio signal), converting signal frequencies, applying a distortion to the signal, and/or otherwise modifying the audio signals and/or communication system operation. However, the audio signal can be otherwise modified based on the comparison to the second threshold.

In some variants, S240 can include terminating (e.g., ceasing, stopping) operation of the communication system (e.g., changing the operation mode, turning off the communication system, disabling one or more transducers, etc.) when the audio signal exceeds a transmission threshold (e.g., a timeout, a threshold speaking duration, etc.).

In some embodiments, the method can include detecting echo, cancelling echo, and/or any suitable steps. The echo can arise, for example, when two or more users (e.g., a listener and a speaker) are in close proximity (e.g., same physical location; communication systems mechanically coupled such as wearables touching, wearables touching a common surface, etc.; etc.), so that the output from the listener is detected by the speaker. The echo is preferably detected as an amplification of and/or signal strength of a characteristic frequency or frequency range of the audio signal, but can additionally or alternatively be detected as a transmission of substantially the same audio signal (e.g., similar signal shape, waveform, bandwidth, etc.) after a delay, user feedback (e.g., indication of echo), a signal strength, and/or otherwise be detected. The predetermined frequency(s) is typically less than 400 Hz, but can be greater than 400 Hz. In an illustrative example, when a characteristic frequency of the audio signal exceeds an echo threshold, echo can be detected in the signal. However, echo can be alternatively detected.

When an echo (or suspected echo) is detected, the method can include mitigating and/or removing the echo. Echo can be removed from the audio signal by filtering (e.g., using an analog or digital filter to remove specific frequencies and/or frequency bands), by disabling one or more of the communication systems that are contributing to the echo, decreasing coupling between communication systems contributing to the echo (e.g., by separating the communication systems), by applying an inverse signal to cancel the echo, and/or otherwise mitigate or remove the echo. The echo can be mitigated, removed, and/or suppressed using a digital signal processor and/or an analog circuitry.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A bone conduction communication system comprising:
a bone conduction transducer configured to operate as a bone conduction speaker or as a bone conduction microphone;
a communication module configured to transmit and receive acoustic signals;
a digital signal processor configured to determine whether the received acoustic signal exceeds a threshold; and
a switch configured to connect the bone conduction transducer to an input of the digital signal processor, wherein when the received acoustic signal exceeds the threshold the switch is configured to connect the bone conduction transducer to an output of the digital signal processor, wherein the bone conduction transducer is configured to operate as a bone conduction microphone when the bone conduction transducer is connected to the input of the digital signals processor, and wherein the bone conduction transducer is configured to operate as a bone conduction speaker when the bone conduction transducer is connected to the output of the digital signals processor.

2. The bone conduction communication system of claim 1, wherein the switch is further configured to connect the bone conduction transducer to the input of the digital signal processor after a threshold time has elapsed that the received acoustic signal does not exceed the threshold.

3. The bone conduction communication system of claim 2, wherein the threshold time is between 100 ms and 1000 ms.

4. The bone conduction communication system of claim 1, wherein the digital signal processor comprises an echo detector configured to detect when the transmitted or the received acoustic signal is repeated.

5. The bone conduction communication system of claim 4, wherein the digital signal processor is configured to remove the repeated signal.

6. The bone conduction communication system of claim 1, further comprising an acoustic microphone configured to detect environmental noise proximal a user, wherein the threshold depends on an amplitude of the environmental noise.

7. A bone conduction communication system comprising:
   a first bone conduction transducer within a first housing, wherein the first housing comprises:
      a first vibration coupler arranged between the first bone conduction transducer and a head surface of a user, wherein the first housing is configured to attach to a first portion of the head surface of the user contacting at the first vibration coupler; and
      a first vibration dampener arranged between the first bone conduction transducer and the first housing;
   a second bone conduction transducer within a second housing, wherein the second housing comprises:
      a second vibration coupler arranged between the second bone conduction transducer and the head surface of the user, wherein the second housing is configured to attach to a second portion of the head surface of the user contacting at the second vibration coupler; and
      a second vibration dampener arranged between the second bone conduction transducer and the second housing; and
   a third housing, connected to the first housing and the second housing, wherein the third housing contains an electronics subsystem comprising:
      a power supply, configured to power the electronics subsystem, the first bone conduction transducer, and the second bone conduction transducer;
      a communication module configured to transmit an internal sound signal to a communication link and to receive an external sound signal from the communication link; and
      a digital signal processor configured to process the internal sound signal or the external sound signal.

8. The bone conduction communication system of claim 7, wherein at least one of the first vibration coupler or the second vibration coupler comprises a thickness of at most 0.5 mm.

9. The bone conduction communication system of claim 8, wherein at least one of the first vibration dampener or the second vibration dampener comprises a thickness of at least 1 mm.

10. The bone conduction communication system of claim 9, wherein at least one of the first vibration coupler, the second vibration coupler, the first vibration dampener, or the second vibration dampener comprises silicone.

11. The bone conduction communication system of claim 7, wherein the third housing comprises a third bone conduction transducer configured to contact a third portion of the head surface of the user.

12. The bone conduction communication system of claim 11, wherein the third bone conduction transducer is mounted to a cantilever offset from the third housing.

13. The bone conduction communication system of claim 11, wherein at least one of the first or the second bone conduction transducer comprises an electromechanical transducer, wherein the third bone conduction transducer comprises a piezoelectric transducer.

14. The bone conduction communication system of claim 7, wherein the first housing is connected to the electronics compartment by a coiled wire and wherein the second housing is connected to the electronics compartment by a second coiled wire, wherein the first housing does not directly contact the second housing.

15. The bone conduction communication system of claim 7, further comprising a switch configured to operate based on operation instructions generated by the digital signal processor, wherein the operation instructions comprise:
   a default state connecting the first bone conduction transducer and the second bone conduction transducer to an output of the digital signal processor, wherein in the default state internal audio signal is transmitted to the communication link; and
   wherein when an amplitude of the external audio signal exceeds a threshold the switch is configured to connect the first bone conduction transducer and the second bone conduction transducer to an input of the digital signal processor to transmit the external audio signal to the first portion and the second portion of the head surface of the user.

16. The bone conduction communication system of claim 15, wherein the switch is further configured to return to the default state after a threshold time has elapsed since the amplitude of the external audio signal exceeded the threshold.

17. The bone conduction communication system of claim 16, wherein the threshold time is between 100 ms and 1000 ms.

18. The bone conduction communication system of claim 7, wherein at least one of the first housing, the second housing, or the third housing comprises an audio microphone configured to record an environmental audio signal associated with an environment proximal the user.

19. The bone conduction communication system of claim 7, wherein the first housing, the second housing, and the third housing are mountable to a safety helmet.

20. A bone conduction communication system comprising:
   a first bone conduction transducer within a first housing, wherein the first housing comprises a first vibration coupler arranged between the first bone conduction transducer and a head surface of a user, wherein the first housing is configured to attach to a first portion of the head surface of the user contacting at the first vibration coupler;
   a second bone conduction transducer within a second housing, wherein the second housing comprises a second vibration coupler arranged between the second bone conduction transducer and the head surface of the user, wherein the second housing is configured to attach to a second portion of the head surface of the user contacting at the second vibration coupler; and
   a third housing, connected to the first housing and the second housing, wherein the third housing contains an electronics subsystem comprising:
      a power supply, configured to power the electronics subsystem, the first bone conduction transducer, and the second bone conduction transducer;

a communication module configured to transmit an internal sound signal to a communication link and to receive an external sound signal from the communication link;

a digital signal processor configured to process the internal sound signal or the external sound signal; and a switch configured to operate based on operation instructions generated by the digital signal processor, wherein the operation instructions comprise:
  a default state connecting the first bone conduction transducer and the second bone conduction transducer to an output of the digital signal processor, wherein in the default state internal audio signal is transmitted to the communication link; and
  wherein when an amplitude of the external audio signal exceeds a threshold the switch is configured to connect the first bone conduction transducer and the second bone conduction transducer to an input of the digital signal processor to transmit the external audio signal to the first portion and the second portion of the head surface of the user.

21. The bone conduction communication system of claim 20, wherein the switch is further configured to return to the default state after a threshold time has elapsed since the amplitude of the external audio signal exceeded the threshold.

22. The bone conduction communication system of claim 21, wherein the threshold time is between 100 ms and 1000 ms.

23. The bone conduction communication system of claim 20, wherein the third housing comprises a third bone conduction transducer configured to contact a third portion of the head surface of the user.

24. The bone conduction communication system of claim 23, wherein the third bone conduction transducer is mounted to a cantilever offset from the third housing.

25. The bone conduction communication system of claim 23, wherein at least one of the first or the second bone conduction transducer comprises an electromechanical transducer, wherein the third bone conduction transducer comprises a piezoelectric transducer.

* * * * *